March 31, 1936.     O. P. LIEBREICH     2,035,612
REMOTELY CONTROLLED RADIO RECEIVING SYSTEM
Filed March 11, 1931     11 Sheets-Sheet 1
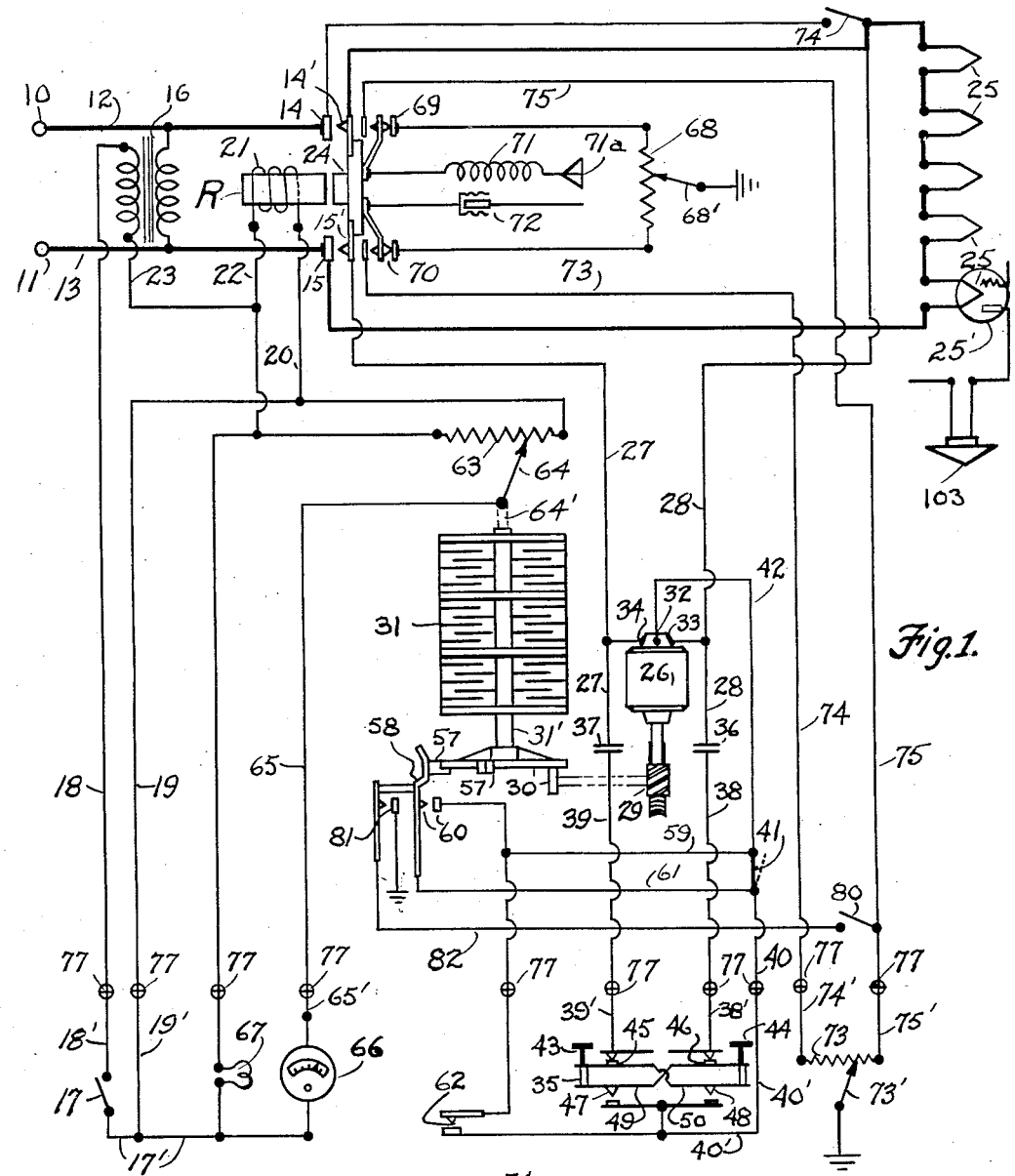
Fig.1.
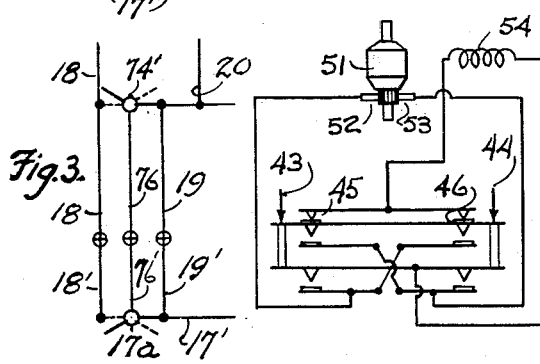
Fig.3.    Fig.2.    Oscar P. Liebreich
INVENTOR March 31, 1936.  O. P. LIEBREICH  2,035,612

REMOTELY CONTROLLED RADIO RECEIVING SYSTEM

Filed March 11, 1931    11 Sheets-Sheet 2

Oscar P. Liebreich
Inventor

March 31, 1936.  O. P. LIEBREICH  2,035,612
REMOTELY CONTROLLED RADIO RECEIVING SYSTEM
Filed March 11, 1931  11 Sheets-Sheet 3

Oscar P. Liebreich
Inventor

March 31, 1936. O. P. LIEBREICH 2,035,612

REMOTELY CONTROLLED RADIO RECEIVING SYSTEM

Filed March 11, 1931 11 Sheets-Sheet 4

Oscar P. Liebreich
Inventor

March 31, 1936.　　　O. P. LIEBREICH　　　2,035,612
REMOTELY CONTROLLED RADIO RECEIVING SYSTEM
Filed March 11, 1931　　　11 Sheets-Sheet 5

Oscar P. Liebreich,
INVENTOR

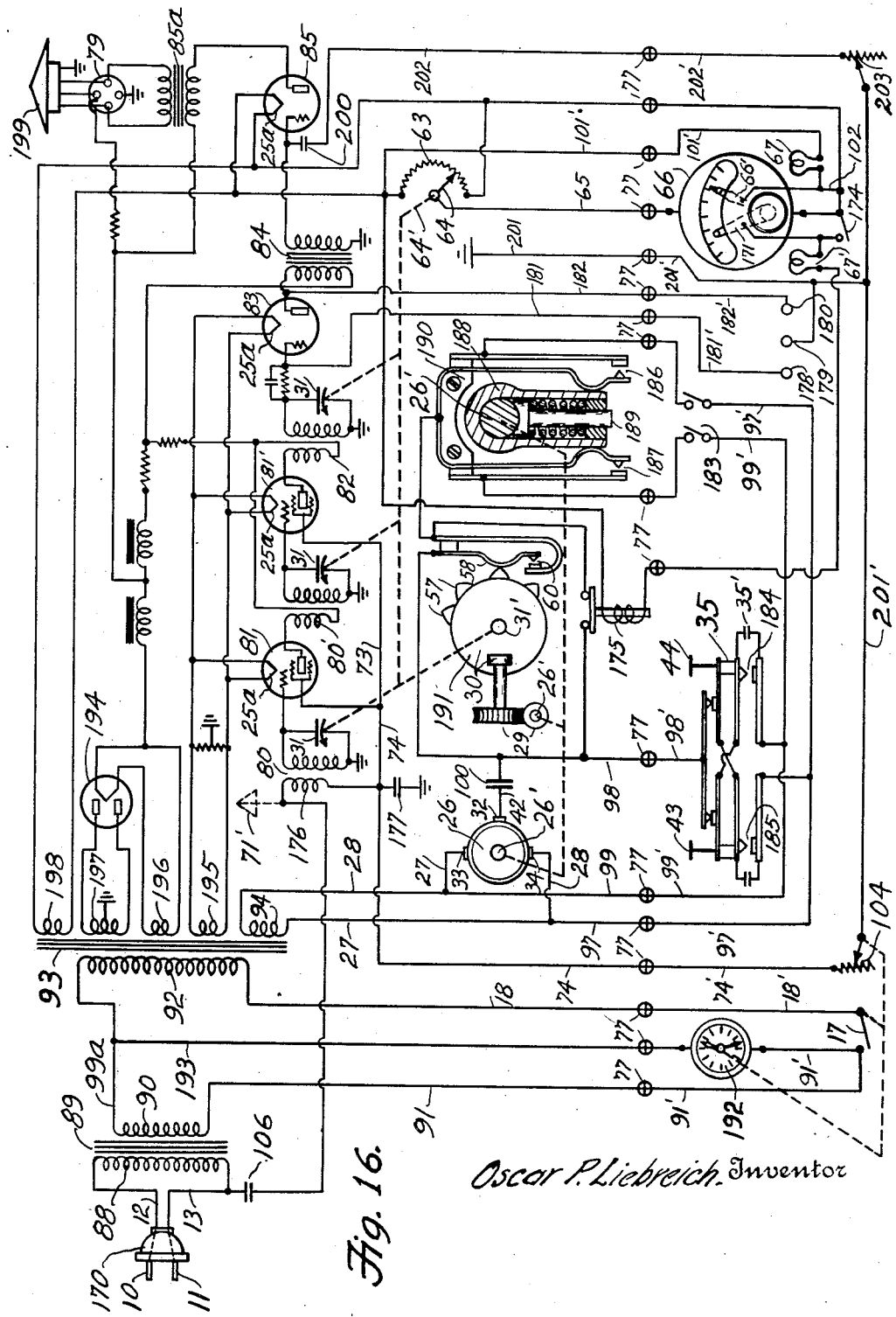

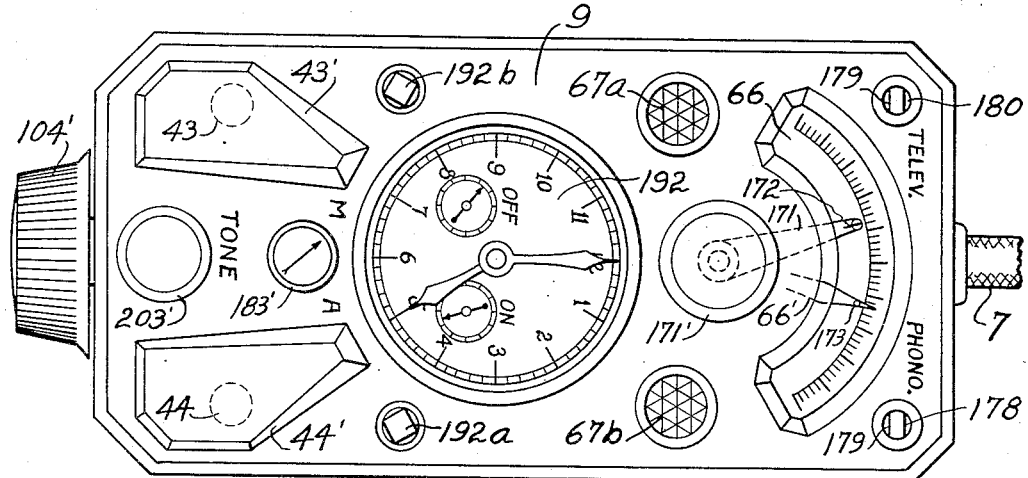
Fig. 17.
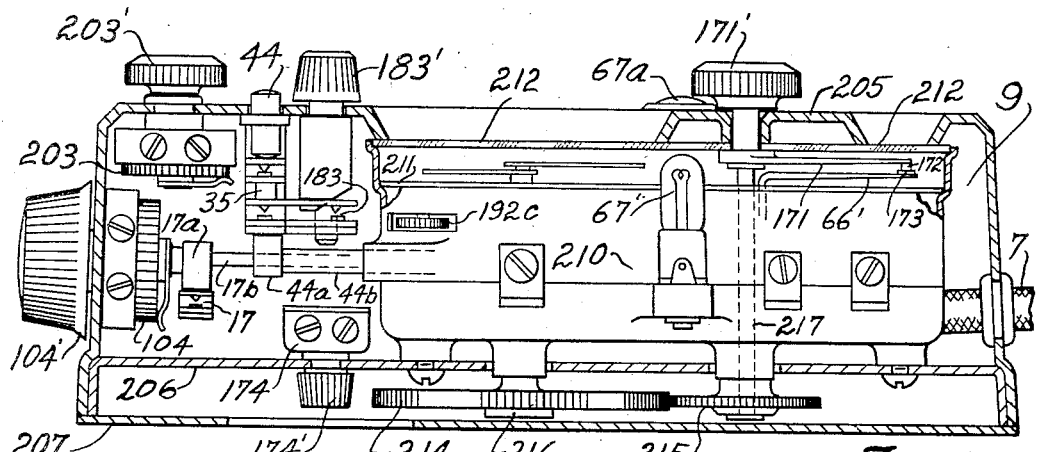
Fig. 18.
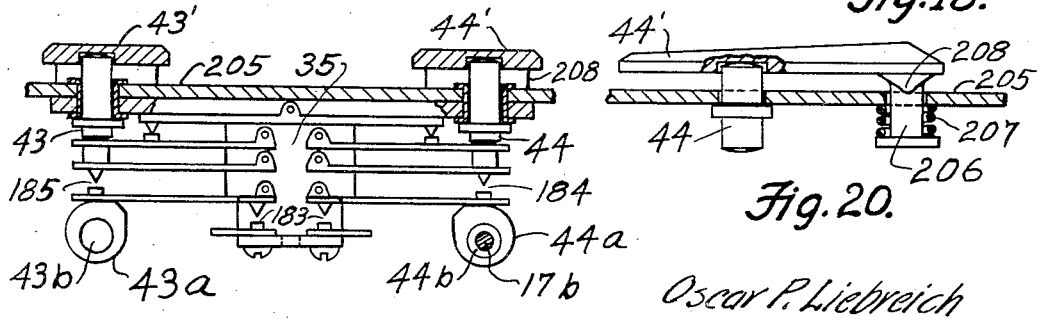
Fig. 19.
Fig. 20.
Oscar P. Liebreich
INVENTOR March 31, 1936.    O. P. LIEBREICH    2,035,612
REMOTELY CONTROLLED RADIO RECEIVING SYSTEM
Filed March 11, 1931    11 Sheets-Sheet 8
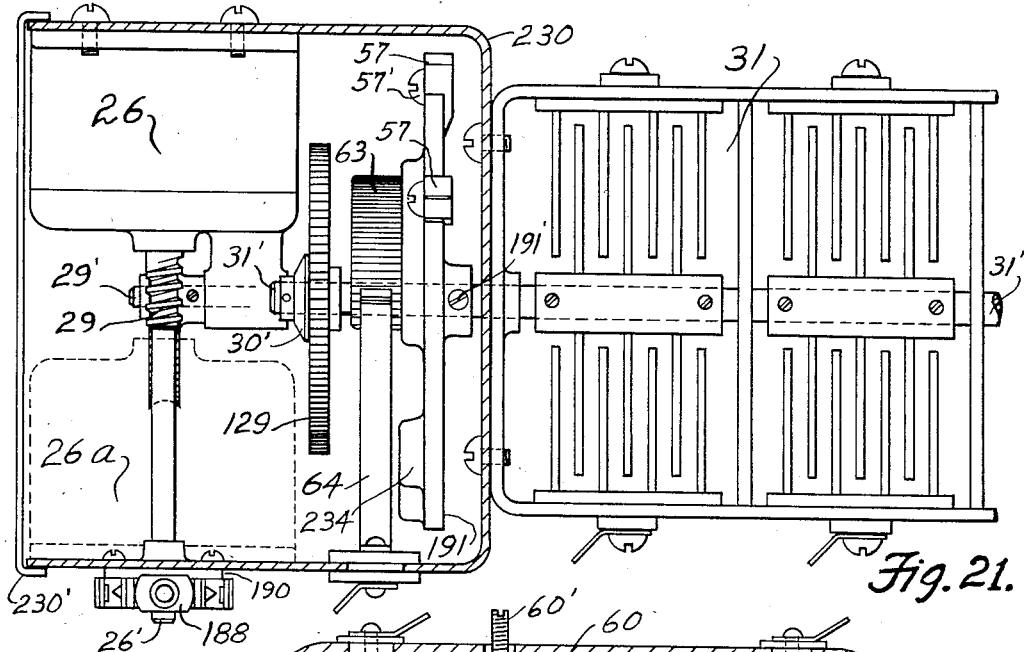
Fig. 21.
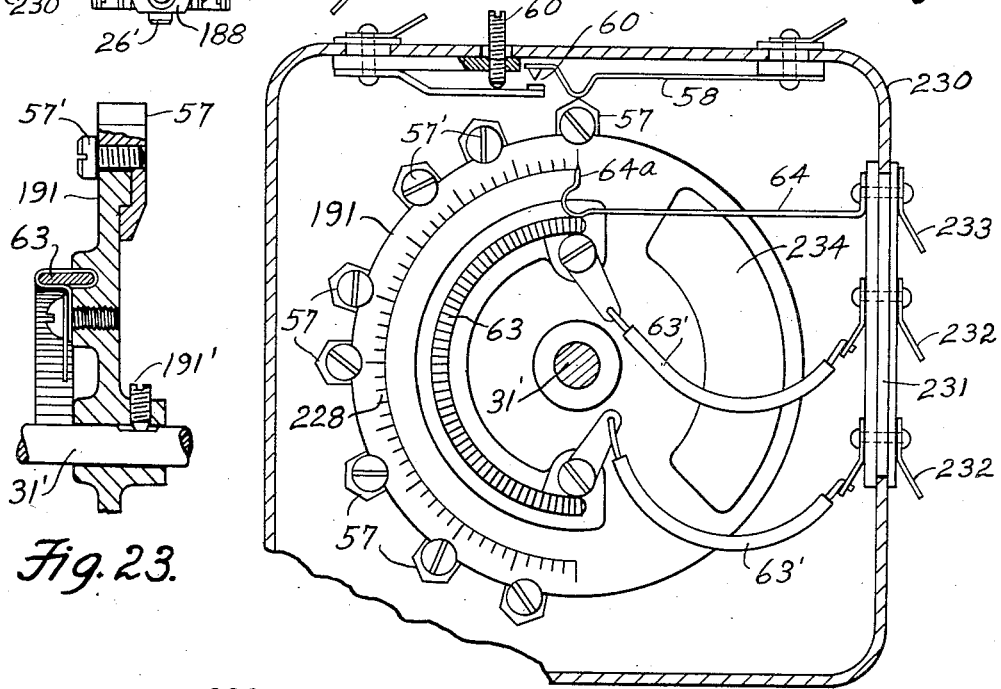
Fig. 23.    Fig. 22.    Oscar P. Liebreich
INVENTOR
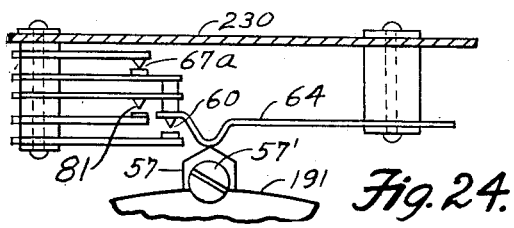
Fig. 24.

March 31, 1936.  O. P. LIEBREICH  2,035,612
REMOTELY CONTROLLED RADIO RECEIVING SYSTEM
Filed March 11, 1931  11 Sheets-Sheet 9

Oscar P. Liebreich.
INVENTOR

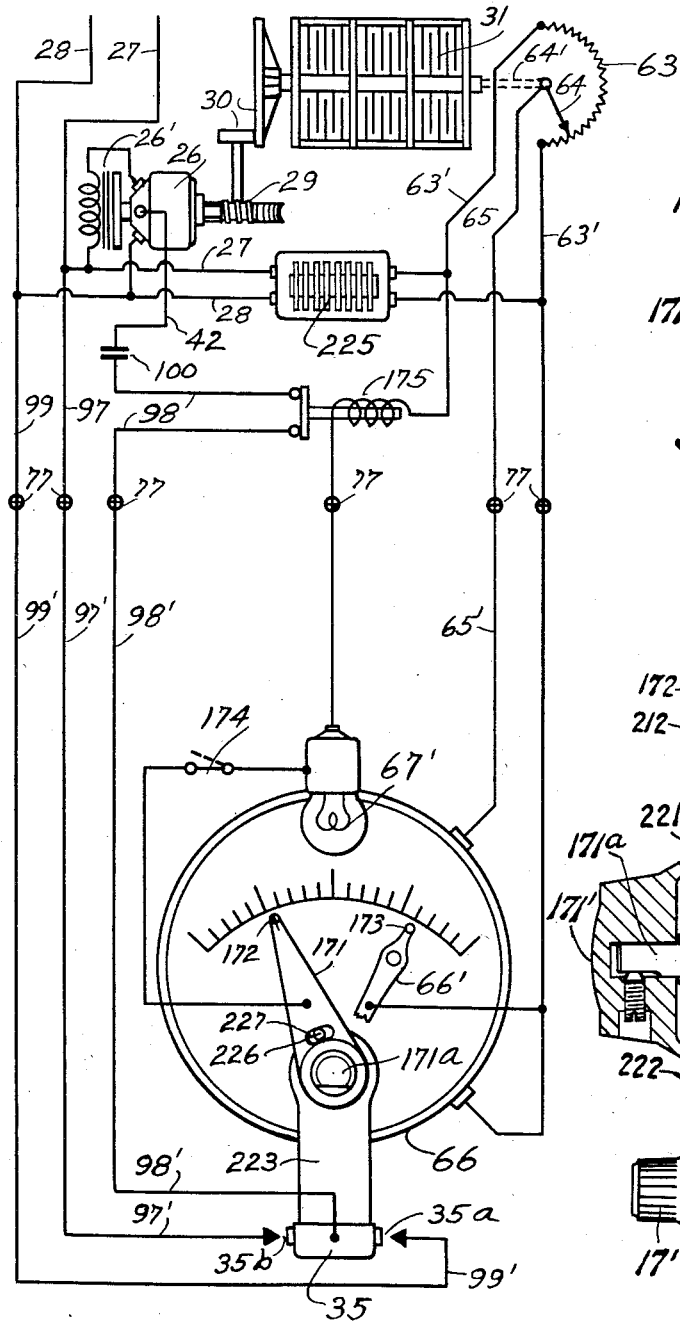
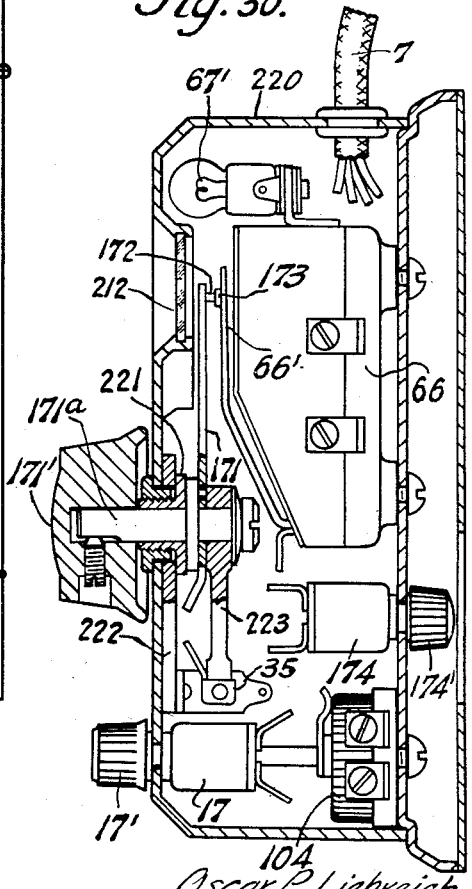

March 31, 1936. O. P. LIEBREICH 2,035,612
REMOTELY CONTROLLED RADIO RECEIVING SYSTEM
Filed March 11, 1931 11 Sheets-Sheet 11

Oscar P. Liebreich
INVENTOR

Patented Mar. 31, 1936

2,035,612

UNITED STATES PATENT OFFICE 2,035,612

REMOTELY CONTROLLED RADIO RECEIVING SYSTEM

Oscar P. Liebreich, New York, N. Y.

Application March 11, 1931, Serial No. 521,690

6 Claims. (Cl. 250—40)

This invention, like that disclosed in my previous application Serial Number 188,955, relates, generally, to remote controlled radio receiving sets or receivers for use in receiving and reproducing music and voice transmitted from radio broadcasting stations, but more specifically to a system of remote control for alternating current operated radio receivers as used for instruction and entertainment in homes, schools, hotels, restaurants and other buildings.

Radio receivers used for detecting and rectifying the broadcast radio wave into music or speech consist of a radio receiver and a radio loud speaker. Such a receiver has three essential control units, namely a means for putting the receiver into operation, a selector or tuning control for selecting the various broadcast stations, and a volume control for adjusting the set to produce sound of the desired volume for the loud speaker.

At present these controls are usually placed on a control board or panel placed on the front of the receiver for manual operation with the speaker built into the set or connected to it by leads. To control such a receiver, it is necessary to be within easy reach of the controls on the panel or if the operator chooses to take up a position remote from the receiver to take full advantage of sound waves emitted from the speaker, it is necessary to move close to the receiver to operate the controls.

Because of the lack of a better control of radio receivers the design, operation and sales of receiving sets has been greatly handicapped. Since the receiver must be conveniently located, radio receiving sets must be placed in expensive ornamental cabinets, considered as articles of furniture and as such must be small in size and handsome in appearance and are costly.

The operator of a radio receiver should at all times take a position a little distance from the speaker to fully appreciate the tone and volume of the program. As the programs are changed or various numbers are played at the broadcasting studio, it is frequently necessary to adjust at least one of the primary controls. In the home where most receivers are used, it becomes vary irksome to be continually getting up or to remain close to the receiver to make the necessary adjustments to the controls for best reception with the result that adjustment is often neglected, programs are not received properly and the set is operated at a disadvantage.

In homes, especially, it is very desirable to have the benefits of radio reception and convenient radio receiver control in a number of rooms. Individual radio receivers in each room would result in prohibitive cost as well as radio interference and the inconvenience of panel control, therefore it is much more desirable to install a single radio receiver which can be controlled and adjusted from a number of points or control stations, located in various rooms, means being provided for connecting radio loudspeakers or reproducers, It is also desirable to have only the selected loud-speaker connected when the remote control unit is attached to a control receptacle, with such connection made automatically without the additional manipulation of switches to cut out other loudspeakers in the system. It is also often desirable to thus automatically hook up various selected speakers in series, in parallel and in series-parallel combinations dependent on the size and acoustical characteristics of the room or group of rooms.

When a number of control outlets are provided in various locations in a home, it is an advantage to provide connections for lamps and other household electrical appliances and thus economize in the cost of the house wiring system. The control receptacles should provide attachment for all control and reproducer circuits as well as current to operate the field of dynamic reproducers. Each control outlet or receptacle should provide a connection for a remote control unit for completely controlling the receiver which could then be placed in an out of the way location such as basement or closet, saving space and making it unnecessary to house the set in expensive ornamental cabinets.

If an ornamental cabinet is desired, the radio set could be attached to any control receptacle which would automatically provide operating current for the set as well as antennæ, ground and loudspeaker connections for the same. In this event, dual control could be provided whereby adjustments may be made either at the panel or at the remote control unit, each independent of the other. The set could also be turned on and off and stations tuned in automatically at any predetermined time by means of an electrically operated time clock in the remote control unit.

Provision can be made at the remote control unit to electrically record entertainments and also reproduce records, such as phonograph records, by means of microphones and electrical pickups connected to the remote control unit and operating through the amplifiers of the radio set and through the loud speakers of the remote control system. Television can also be picked up by the receiver and the images reproduced by a televisor connected to the remote control unit in any room, at the same time that programs are heard, both image and sound being controlled at the remote control unit. In this manner an entire stage play or talking moving picture could be fully reproduced in various locations in the home through this remotely controlled radio receiving system.

Heretofore, remote control devices for alternating current operated radio sets have been complicated and expensive and have only partially utilized the full utility and convenience of the art of radio reception and reproduction with the result that the advantages of radio reception are not fully enjoyed and the sales of remotely controlled radio receivers have been greatly handicapped. By the lack of a thoroughly comprehensive and practical system for the complete control of radio receivers from one or many locations distant from a central receiver, the application of radio reception to schools, hotels, restaurants, apartment houses and private dwellings has been greatly delayed since radio reception is primarily intended for homes and residences, the application of this invention should greatly stimulate interest in homes, in architecture and in the real estate business generally.

For the above reasons and many others the present methods of remotely controlling radio receivers are unsatisfactory, uneconomical and inconvenient.

Therefore, it is the object of my invention to provide a comprehensive system for the complete remote control of radio receivers, which will be convenient, satisfactory and inexpensive.

It is a further object to provide a system of remote control for alternating-current operated radio receivers whereby the essential operations of tuning adjustment, volume adjustment and starting and stopping the operation of the receiver, may be performed from one or several points remote from the receiver and within the limits of the system.

It is a further object to provide a control system whereby an alternating current operated radio receiver may be controlled from one or several points, distant from the receiver, to adjust the tuning of the receiver to various radio wave lengths or broadcasting stations, to adjust the volume of sound emitted from a loudspeaker or sound reproducer connected to the receiver, and to put the receiver into and out of operation by controlling the operating current circuit to the receiver.

It is further an object to perform the above mentioned controlling operations from a number of locations or rooms of a building provided with a number of loud speakers which are connected to a radio receiver, in such manner that only a preselected speaker or preselected speakers, emit sound when the receiver is being controlled from a given location or control station.

It is a further object to provide a system of remote control for radio receivers whereby a receiver may be attached to any one of a number of receptacles or stations, to make antenna, ground, loud speaker and operating-current connections to the receiver, and whereby the receiver may be controlled by a control unit attached to any other one of said receptacles or stations.

It is a further object to provide a remote control system and apparatus for same, whereby the above mentioned receptacles provide attachment and control for loud speakers as well as attachment for electrically operated appliances.

It is a still further object to provide a system of remote control for a radio receiver and apparatus for the same, whereby any or all of the above mentioned objects may be noted as well as the following: To provide a remote control unit connected to a receiver whereby controlling operations are performed with low voltage current; to provide illumination in the various indicators; to provide a pilot light in the remote control to indicate the condition of operation of the receiver; to provide a tuning indicator in the remote control unit to indicate the adjustment of the tuning unit in the receiver; to provide a luminous tuning indicator in the remote control unit to indicate when the receiver has been tuned to a predetermined wave length; to provide means in the remote control unit whereby the tone or pitch of the sound emitted by a loudspeaker or signal reproducer attached to the output circuit of the receiver, is adjusted; to provide means whereby the tuning of the receiver may be adjusted by a manually operated control in the remote control unit; to provide automatic tuning of the input circuit of a receiver to various frequencies, by means of controls in the remote control unit; to provide automatic tuning by means of a momentary contact control switch in the remote control unit and an automatic switch at the receiver; to provide progressive automatic-station tuning of the receiver; to provide pre-selected automatic-station tuning of the receiver; to provide silent tuning of stations intermediate the automatically tuned stations; to provide an electrically operated time clock in the remote control unit; to provide an electrically operated time clock for controlling the operation of the receiver at predetermined intervals of time; to provide a time clock in the remote control unit for controlling the tuning of the receiver at predetermined intervals of time; to provide an interlocked tuning control switch in the remote control unit whereby only one tuning control circuit can be completed at any one time; to provide means in the remote control unit whereby the reproduction of phonograph records may be accomplished through the receiver and the remote control system, and whereby sound may be recorded on records; to provide means in the remote control unit whereby images transmitted or broadcast, by radio, such as television, may be received by the radio receiver and pictured by a device, such as a televisor, attached to the remote control unit; to provide receptacles whereto the remote control unit may be connected to perform the above mentioned controlling operations as well as the automatic connection of selected loud speakers connected in series, in parallel and in series parallel; to provide the above mentioned receptacles whereby the radio receiver may be connected to the remote control system and whereto various telephone speakers and electric appliances may be simultaneously or individually attached; to provide means whereby when the remote control unit is disconnected from any of the above receptacles, the radio receiver is automatically disconnected from its source of operating current; to provide means whereby the radio receiver may have dual controls at the control panel of the receiver or at the remote control stations; to provide control of volume of sound rendered by the signal reproducer connected to the receiver, from a control in the remote control unit by regulating the performance of the radio-stage or input circuit of the receiver; to provide tuning adjusting means at the radio receiver whereby the receiver may be tuned by controls in the remote control station, to provide braking means, friction drive means, tuning indicator-control means, automatic tuning means and silent tuning means at the receiver and in operative association with the tuning means of the receiver; to provide a radio remote control system as above described whereby low voltage control currents are obtained from the common current supply for operating the radio receiver, the same obtained by means of step-down and step-up transformers; to provide an electromagnetic non-rotating type tuning-actuating motor, with speed control means for regulating the rapidity of the tuning adjustment; and to provide a radio remote control system of the class described, which can be readily applied to any radio receiver.

With the above objects in view, and others which will be detailed during the course of this specification, my invention consists in the method and in the parts, features, elements, and combinations thereof hereinafter described and claimed.

The accompanying drawings show for the purpose of illustration several of the many possible embodiments the present invention may take, it being understood that the drawings are illustrative of the invention rather than limiting the same.

In the drawings, like parts are indicated by like numbers, and

Fig. 1 is a wiring diagram of a remote control system for a radio receiver adapted to be operated on alternating current, parts of the radio receiver being omitted.

Fig. 2 is a fragmentary diagram illustrative of a modified motor control diagram, the motor being adapted to operate on direct current.

Fig. 3 is a fragmentary diagram of a modified control switch for dual panel and remote control.

Figure 11:
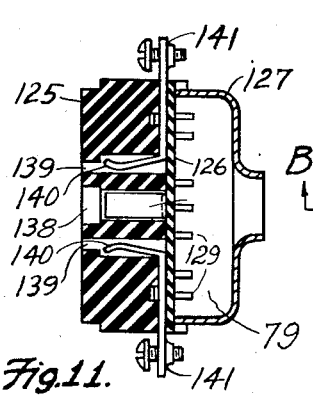
Figure 8:
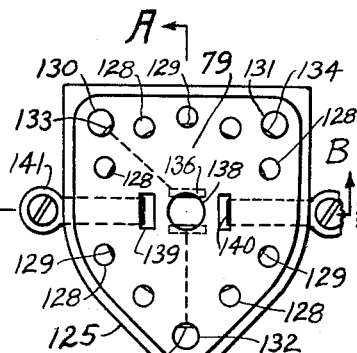
Fig. 8 is a view showing the front of a detachable plug receptacle indicated in Fig. 7.

Fig. 11 horizontal section through B—B of Fig. 8.

Figure 7:
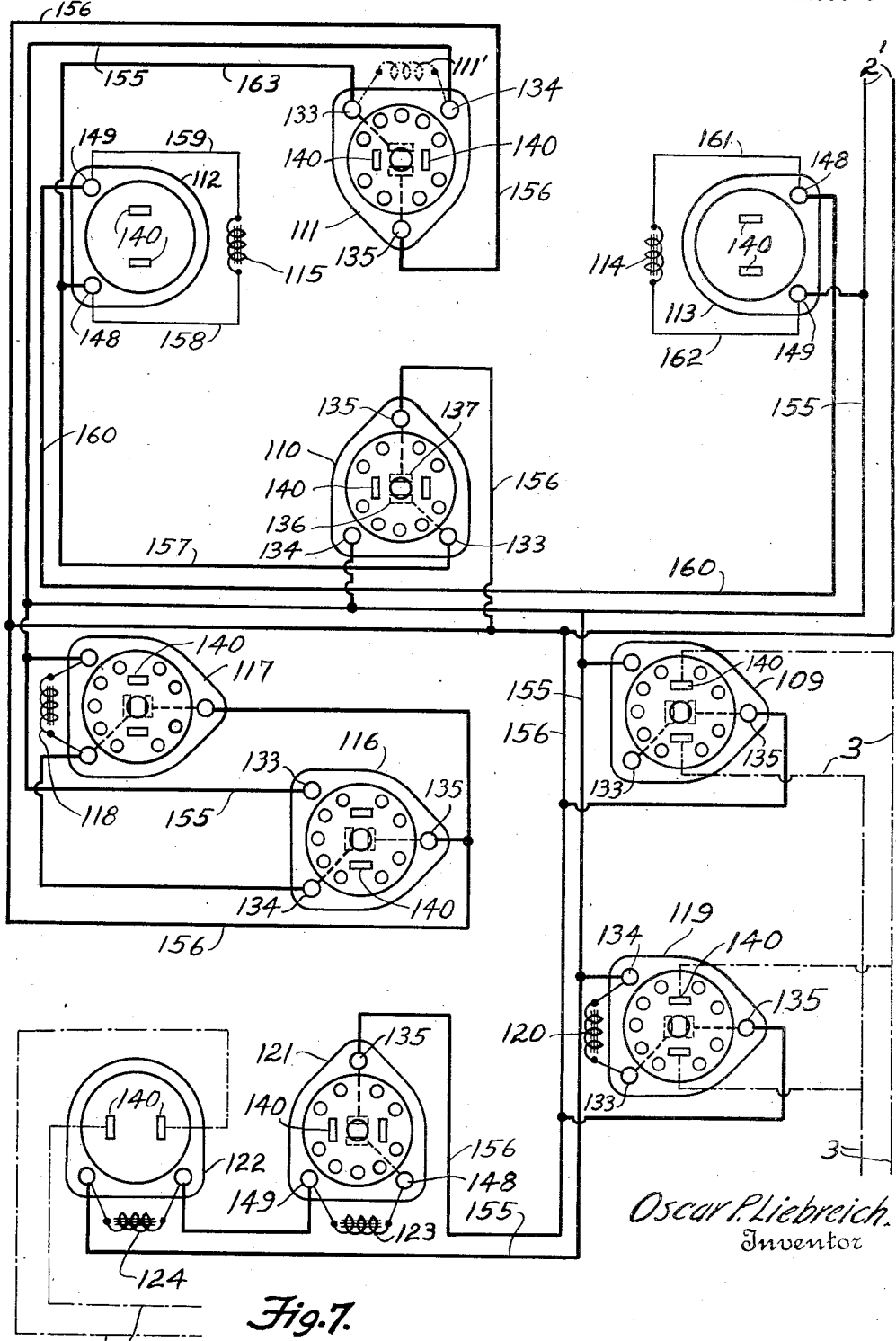
Fig. 7 is a more detailed wiring diagram of the loud speaker circuit of the radio remote control system shown in Fig. 6.
Figure 12:
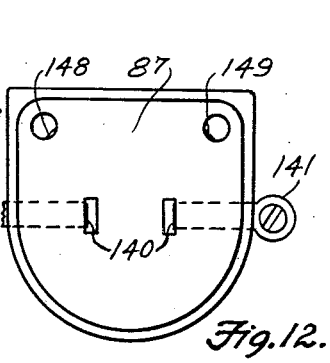

Fig. 12 is a view showing the front of a special detachable plug receptacle indicated in Fig. 7.

Figures 9, 13:
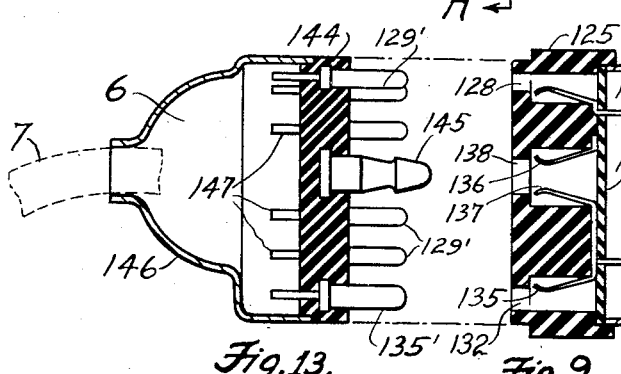
Fig. 9 is a sectional elevation along A—A of Fig. 8.
Figure 10:
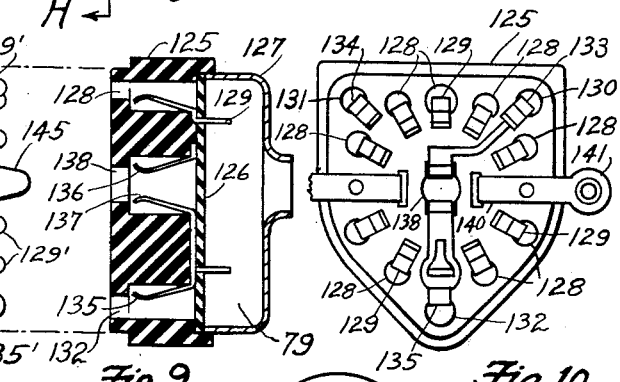
Fig. 10 is a view showing the back of a detachable plug receptacle, with parts removed.

Fig. 13 is a vertical elevation section through a detachable plug adapted to be attached to receptacles indicated in Figs. 5, 6, 7, and 8.

Figure 4:
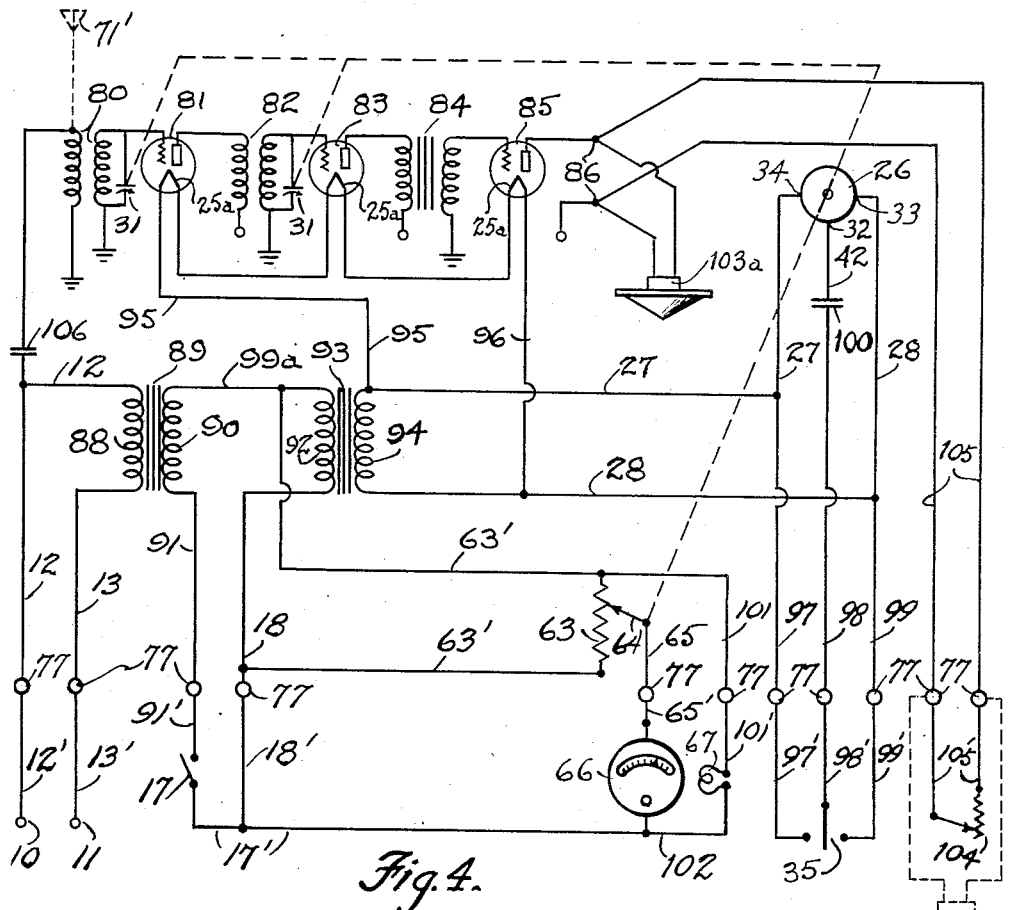
Fig. 4 is a wiring diagram of a modified remote control system for radio receivers adapted to be operated on alternating current, parts of the radio receiver being omitted.
Figure 5:
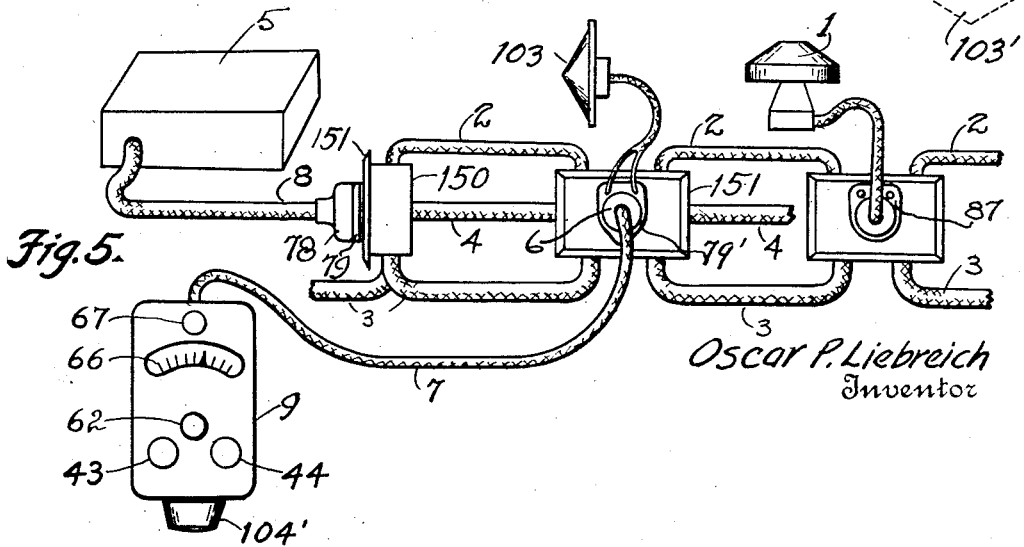
Fig. 5 is a schematic diagram of a radio remote control system as installed in a dwelling.
Figure 6:
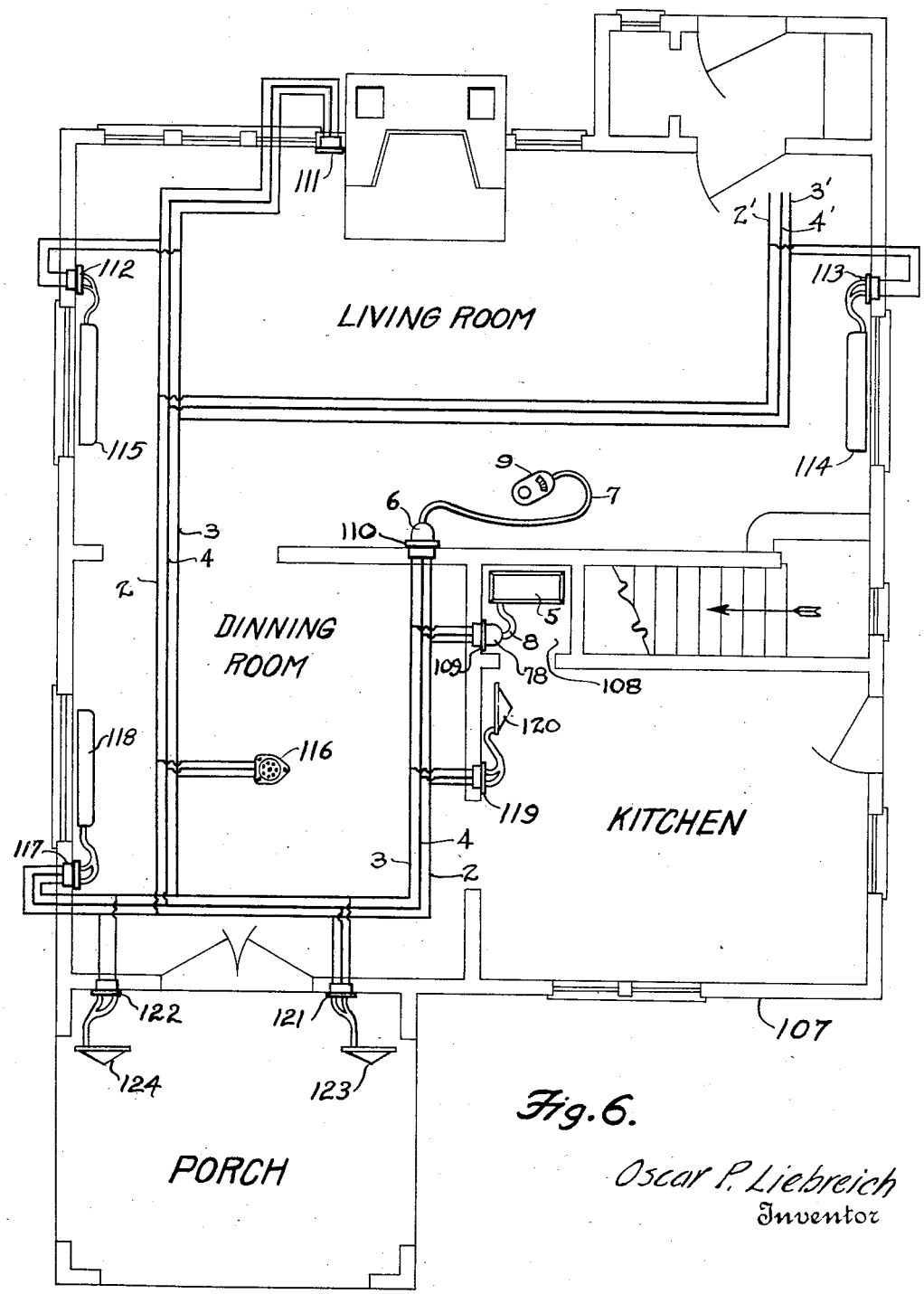
Fig. 6 is a wiring diagram of a radio remote control system as applied to a dwelling.
Figure 14:
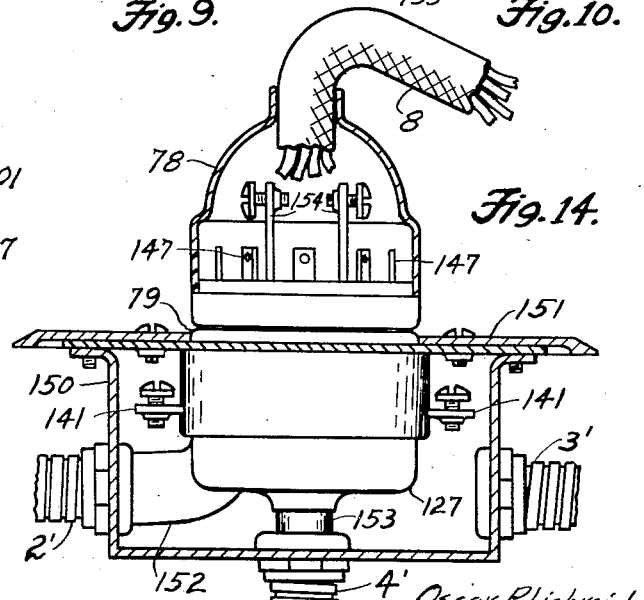

Fig. 14 is a view, partially in section, of a detachable plug and receptacle indicated in Figs. 4, 5, and 6.

Figure 15:
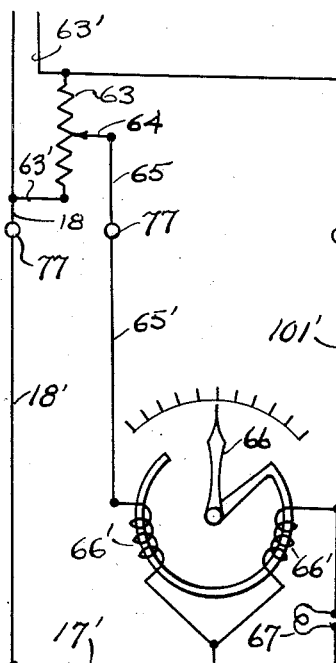

Fig. 15 is a schematic diagram of a modified tuning indicator and control adapted to be used in Fig. 4.

Fig. 16 is a schematic diagram of a modified system of an alternating current radio remote control system, parts of the radio receiver being omitted.

Fig. 17 is a plan view of a remote control unit indicated in Fig. 16.

Fig. 18 is an elevation, partially in section, of Fig. 17.

Fig. 19 is a detail view of tuning control indicated in Figs. 16 and 18.

Fig. 20 is an enlarged detail view of control button indicated in Fig. 17.

Fig. 21 is a plan view, partially in section, of tuning unit indicated in Figs. 1 and 16.

Fig. 22 is a sectional elevation through Fig. 21.

Fig. 23 is a sectional elevation through the cam disc shown in Figs. 21 and 22.

Fig. 24 is a view of a modified form of cam contacts of Figs. 21 and 22.

Figure 25:
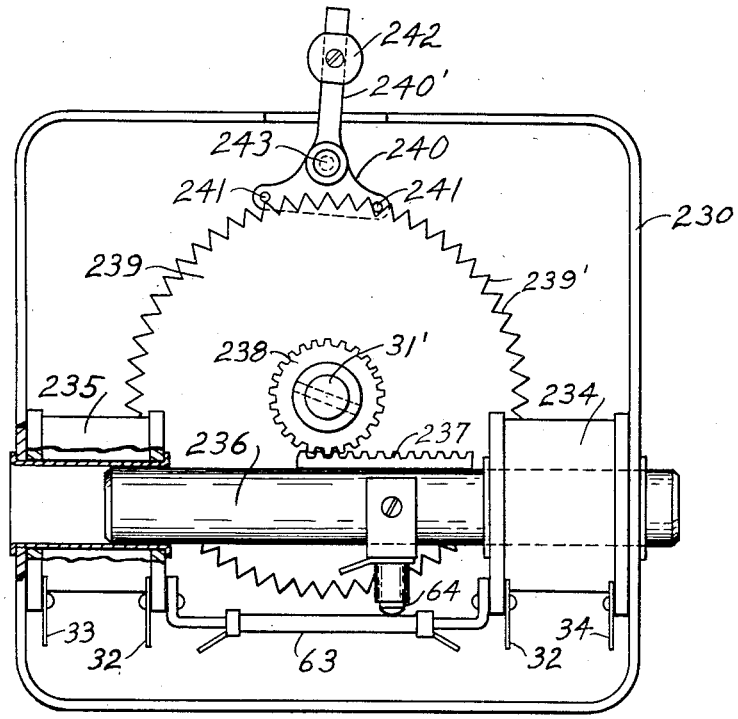

Fig. 25 is a view, partially in section, of a modified form of tuning unit actuating means.

Figure 26:
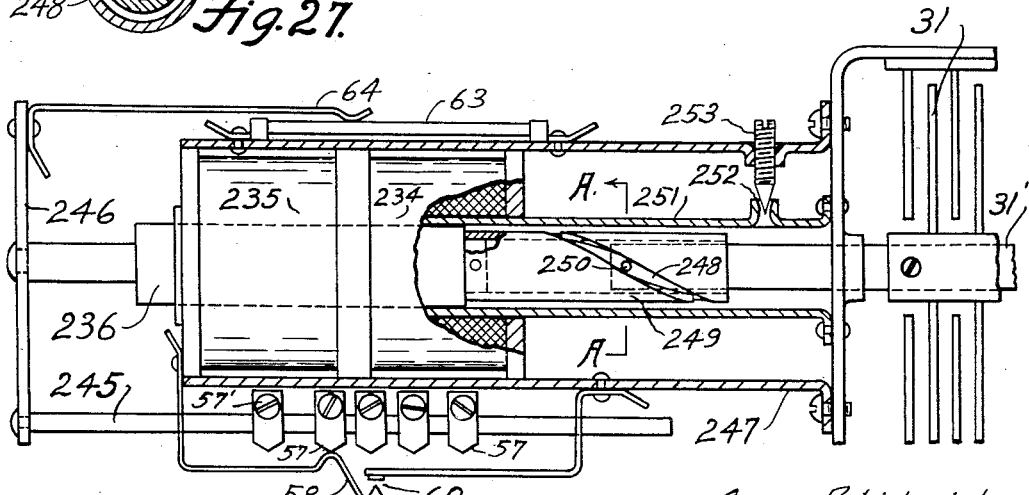

Fig. 26 is a view, partially in section, of a modified form of tuning unit actuating means adapted to be used in Fig. 16.

Figure 27:

Fig. 27 is a sectional view at A—A of Fig. 26.

Fig. 28 is a schematic diagram of modified tuning and control means adapted for use in Fig. 16.

Fig. 29 is an enlarged view of tuning indicator contacts shown in Fig. 28.

Fig. 30 is a sectional elevation of a modified form of remote control unit.

Fig. 31 is a schematic and diagrammatic view of a modified form of alternating current operated radio remote control system, parts of the radio receiver being omitted.

Fig. 32 is a detail view of one of the detachable receptacle terminals of Fig. 31 and adapted for use in Figs. 5, 6, 7, and 8.

In carrying out the present invention it is contemplated that the radio remote control system will consist of a radio receiver unit, a loud-speaker or other reproducer unit or units, a remote control unit, control receptacles and plug attachments and the necessary wiring and circuits to operatably connect the various units. It is further contemplated that the radio receiver will have a suitable housing or cabinet which may be placed in any desired location and which will enclose the transformers, inductances, rectifiers, vacuum tubes, tuning units, resistances, reactances, bypass condensers, filters, chokes and such wiring which is customarily placed in alternating current operated radio receiving sets, together with the tuning operating unit, cable connections and such wiring as is required to operatably connect the various elements of my invention.

In the drawings, for convenience, a conventional radio set is indicated with many of the minor parts omitted. Alternating current for operating the radio set is supplied to terminals 10 and 11, Fig. 1, and is conducted by wires 12 and 13 to contacts 14 and 15 of relay "R". Since the supply current is usually taken from the alternating current lighting circuit, the primary winding of a transformer 16 is connected to supply wires 12 and 13, to provide a supply of low voltage current to operate the various controls. The low voltage current is conducted by a flexible cable to a remote control unit, to be later described, and requires a lighter insulation than the higher voltage supply wires. This wiring diagram is similar to my previous patent application Serial Number 188,955, except that Fig. 1 is modified for alternating current operation.

Pilot switch 17 is closed to complete a low voltage circuit from wires 18 and 18' through switch 17, wires 19', 19 and 20, relay coil 21 and wires 22 and 23, back to the secondary winding of transformer 16. As the circuit is completed, the relay armature 24 closes contacts 14 and 14' and 15 and 15' respectively, thus connecting the radio set to the current supply and operating the radio receiver, the various transformers, resistances, condensers, inductances, etc., for properly energizing the tube filaments 25 and for supplying the proper tube grid and plate currents and voltages, not being shown in Fig. 1 but shown in more detail in Fig. 16.

As the relay contacts are closed and the current supply is connected to the radio tubes, transformers, power units, etc., current is automatically supplied to a reversible motor by wires 27 and 28 indirectly connected to relay contacts 14' and 15'. This motor operating through gearing 29 and friction wheels 30 turns the tuning condensers 31 to adjust the radio set to receive various broadcast wave lengths and thus tune in various broadcasting stations. The field windings of motor 26 are adapted to remain in circuit with the supply current and the armature caused to rotate in the desired direction by connecting a condenser or resistance connected to a central terminal 32, to either side terminal 33 or 34. To prevent the higher voltage alternating current from flowing to reversing switch 35, two condensers 36 and 37 are connected by wires 38 and 39, 38' and 39', 40' and 40, switch 41 and wire 42, to central terminal 32.

Reversing switch 35 is provided with a system of contacts mounted on spring blades insulated from each other and as shown in Fig. 1. As push button 43 is depressed, contacts 45 are opened and contacts 47 closed, thus connecting the capacity of condenser 36 to central terminal 32 and causing the motor armature to rotate in a given direction. As push button 44 is depressed contacts 46 are opened and contacts 48 closed, connecting the capacity of condenser 37 to the central terminal 32 and thus causing the motor armature to rotate in the opposite direction. In this manner, the tuning condenser 31 is operated from the remote reversing switch 35. It will be noted that as either push button is depressed, the opposite set of contacts is automatically broken due to the cross connected blades 49 and 50, so that a short circuit is prevented if both push buttons are simultaneously depressed.

Fig. 2 shows a two-circuit modification of this electrically interlocked switch applied to a conventional type of motor 51 with brushes 52 and 53, field winding 54 and current supply terminals 55 and 56. As push button 43 is depressed, contacts 45 are broken and current from terminal 55 is caused to flow through field coil 54 of the motor into armature 51 through brush 53, out through brush 52 and back to terminal 56. As push button 44 is depressed, current enters the armature 51 through brush 52 causing the armature to rotate in the opposite direction. As the push buttons are released the circuit is broken by the spring blades, thus stopping the rotation of the motor. Should both push buttons be depressed simultaneously, contacts 45 and 46 are opened cutting off the supply current from terminal 55 and preventing short circuit. This motor can be operated from either alternating or direct current, preferably direct current obtained from an alternating current supply by means of a tube or dry rectifier as shown in Fig. 28.

The tuning condenser friction wheel 30 is provided with adjustable cams 57 adapted to engage spring blade 58 having contacts 60 connected across the normally closed switch 41, by wires 59 and 61. With contacts 60 closed and switch 41 open, as the armature of motor 26 turns friction wheel 30, cam 57 engages with spring blade 58 and opens contacts 60, now in series connection with wires 40 and 42, thus stopping the rotation of the motor. With proper adjustment of cams 57, the motor will stop exactly when a preselected station has been tuned in thus automatically tuning any station desired. To move the tuning condensers to tune in another station, one of the push buttons of switch 35 is depressed simultaneously with push button switch 62 which short circuits contacts 60, completing the motor circuit to center terminal 32. In this manner radio broadcast stations can be automatically and progressively tuned in from a remote point, it being unnecessary to skillfully manipulate the push buttons 43 and 44. Figures 16 and 28, to be later described, indicate how stations can be automatically tuned in by a single brief contact of one button, how any automatically tuned station can be preselected without progressively tuning in intermediate stations and how the exact tuning in of any preselected station is automatically indicated by a light flashing on in the remote control unit, as well as silent tuning of intermediate stations.

When tuning in radio stations from a remote point it is necessary to provide an indicator at the remote point which will indicate the position of the tuning condenser and thus indicate the wave length or station corresponding to the adjustment of the tuning condensers.

In Fig. 1 a resistance 63 is provided with a movable contact arm 64 adapted to be rotated as the shaft of tuning condenser 31 is rotated, and connected by wires 65 and 65' to one terminal of a volt meter 66, the other terminal of which is connected to pilot switch 17. As switch 17 is closed, low voltage current is also supplied to resistance 63 as well as lamp 67 adapted to illuminate the dial of the indicating meter 66 and to also act as a pilot light to show when the receiving set has been turned on. As the tuning condenser is rotated, contact arm 64 is moved over resistance 63, conducting to meter 66, the amount of current which resistance 63 has allowed to flow to the contact point on arm 64. Thus the volt meter 66 will indicate the drop in voltage at various positions of the contact arm indirectly indicating the position of the tuning condenser 31. Thus the pointer of the indicating meter in the remote control unit will continuously follow the adjustments of the tuning condenser and indicate the wave length to which the condenser is tuned, the indicating meter at the remote control unit performing the same function as a tuning dial on the conventional panel controlled radio set.

The volume of sound emitted from the loud speaker 103 of the receiving set is normally controlled by a resistance 68, operated from the panel (not shown) of the radio receiver, which is connected through relay contacts 69 and 70 to antenna coil 71, antenna 71a and screen grid 72 of the tubes in the radio amplifying stages. As the contact arm 68' of resistance 68 is rotated, varying portions of antennæ and tube grid currents are shunted to the grounded contact arm 68' thus controlling the volume by regulating the radio input to the receiver and also controlling the quality of sound emitted. In Fig. 1 only one of the tubes 25' is shown, the tube filaments of the radio stages, detector and audio stages being indicated at 25, and in series connection. As pilot switch 17 is closed, thus closing relay armature 24, contacts 69 and 70 are opened and antennæ 71 and grid 72 automatically connected to resistance 73 at the remote control point through wires 74, 74', 75 and 75'. The volume is similarly controlled at the remote point by adjustment of the grounded contact arm 73' of resistance 73. Thus the essential controlling operations for any radio receiver are performed from the remote control unit at a point distant from the receiver. Further additional controlling operations, such as tone control and various tuning operations as well as television and recording, will be later described.

It is often desirable to have silent tuning in between various preselected stations during the tuning operation. This is accomplished by closing switch 80 so that one side of the volume control is grounded, by wire 82, leading to ground contacts 81, silencing the radio receiver while the tube filaments are still in circuit. As cam 57 lifts spring blade 58, it also separates contacts 81, thus opening the grounded connection and restoring the normal operation of the receiver, at which time the volume of sound emitted by the loud speaker may be adjusted by the remote volume control arm 73' in contact with resistance 73.

Visual, as well as audible, indication of the automatic tuning in of a broadcasting station will be later described in connection with Figs. 16, 24, and 28.

Switch 74 is normally operated at the panel of the radio receiver and, when closed, it completes the current supply circuit from terminals 10 and 11 through the tube filaments 25 and power units not shown, thus putting the radio set into operation without the necessity of closing pilot switch 17 at the remote point. This is dual panel and remote control of the radio receiver since the volume can be adjusted at either point as already described and, due to the friction wheels 39, the tuning can also be adjusted at the panel independent of tuning motor drive by means of a tuning knob not shown. To facilitate complete dual control of all three essential controls, a novel radio switching arrangement is shown in Fig. 3. Switch 74 is replaced by switch 74' operated from the panel but placed in the low voltage circuit carried by wires 18, 19, 20, 17', 18', and 19' as before. Switch 17a at the remote point is connected to switch 74' by a third wire 76 and 76', both switches being provided with a center terminal for wire 76 and 76' so that one of the outside terminals is always connected to the center terminal by a spring not shown. Thus it will be seen that if the radio receiver is turned on from the panel by switch 74', it may be turned off at the remote control point by switch 17a or vice versa.

In Fig. 1 terminals 77 are intended to be terminals of a detachable multiwire plug receptacle, all wires and units above terminals 77 lead to the radio receiver 5, Fig. 5, while all wires and units below terminals 77 are in a cable 7 connected to a portable remote control unit 9 of Fig. 5, the wires 18', 19', 39', 38', 74', 75', etc., leading from terminals 77 to the remote control units, constitute wires of a flexible multiwire cable 7 connecting the remote control unit 9 with the detachable plug 6. As the plug is withdrawn, it will be noted that wires 18 and 18' will become disconnected, thus opening the relay armature contacts and assuring that the tube filaments 25 are disconnected from the filament current supply and that the radio set is off. In the wiring diagrams the various resistances, reactances, by-pass condensers, filters, chokes, etc., are not shown, to simplify the drawings.

Fig. 4 illustrates a radio remote control system similar to that of Fig. 1 incorporating modifications intended to simplify and reduce the cost of remote control for a complete home installation such as indicated by Figs. 5, 6, and 7. Radio energy is brought to radio frequency transformer 80 after which it is amplified in the usual manner by tube 81, transformer 82, detector tube 83, audio transformer 84 and audio tube 85, the now audio frequency impulses being delivered to speaker or telephone terminals 86. Tuning condensers for the radio stages are shown at 31, other parts such as grid leak and condenser, filter and by-pass condensers, resistances, chokes, power tubes and other power and filament supply units being omitted in the drawings since the present invention relates more specifically to a system of remote control of any radio receiver.

Alternating current terminals 10 and 11 supply electrical energy to the primary winding 88 of transformer 89. When switch 17 is closed the current is completed from secondary winding 90 through wires 91 and 91', switch 17, wires 17', 18' and 18, primary winding 92 of transformer 93, and wire 99a, back to secondary winding 90 of transformer 89. As this circuit is completed, primary winding 88 induces an alternating current in secondary winding 90 which, passing through primary winding 92, causes current to be further induced in secondary winding 94 of transformer 93. This current is conducted by means of wires 95 and 96, and filament supply units not shown to the filaments and heaters 25a of tubes 81, 83, and 85 of the radio receiver. The transformers are so proportional that the high voltage current at terminals 10 and 11 is reduced to a lower voltage by transformer 89 which current is conducted to the remote control switch 17 after which it is again stepped up by transformer 93 to a higher voltage suitable for operating the conventional radio receiver as indicated. Wires 95 and 96 may be provided with a socket into which a conventional alternating current receiver can be plugged in as indicated at unit "A" in Fig. 31. Both transformers may be constructed on a common frame as a single unit, or transformer 93 may be dispensed with and the low voltage current of transformer 89 utilized directly to operate the radio receiver provided the various electrical units of same have been designed and constructed to operate from the reduced voltage. In this event the filament control will be similar to the previous patent application already mentioned. Thus the remote control cable in which wires 91' and 18' are located preferably conduct low voltage current permitting of less insulation and a lighter and smaller cable.

Secondary winding 94 also delivers current to a motor 26 connected to tuning condensers 31 and to movable contact arm 64 of resistance 63, which, in turn, is connected into the low voltage circuit by wires 63' to operate a tuning indicator 66 in the same manner as described in Fig. 1. The resistance 63 may be connected across the high voltage feed wires 95 and 96 if desired. Motor 26 is operated by remote control switch 35 connected by wires 97, 98, 99, 97', 98', 99', 27, 28, and 42 to condenser 100 in the same manner as Fig. 1. Also pilot light 67, connected by wires 101, 101' and 102 is illuminated when pilot switch 17 is closed to indicate at the remote point when the receiver is operating.

A loud speaker 103a is connected to the terminals 86, the volume of which is controlled by a variable resistance 104 connected by wires 105 and 105' and located in the remote control unit 9 together with switch 17, tuning indicator 66, pilot lamp 67 and motor reversing and control switch 35. As the resistance 104 across the loud speaker terminals 86 is decreased, the volume will be decreased and vice versa, so that the volume of the loud speaker may be controlled as desired. The speaker 103a may be connected to the remote control terminals 77 or located at the remote control unit 9 as the speaker 103' shown by dotted lines. In this latter position it may be provided in the form of portable telephone receivers or a miniature loud speaker. Again, the radio energy may be collected directly by the power wires instead of the antennae 71' by means of antennae condenser 106 connected to one of the power wires 12. A slightly modified and preferable tuning indicator is shown by Fig. 15, which may be inserted into Fig. 4 without change of wiring. A pointer 66 is attached to an open ring pivotally mounted to rotate the electromagnetic fields of coils 66' and 66', the common connection of these coils being connected to wire 17'. As the movable arm 64 is rotated over resistance 63, the magnetic fields of coils 66' and 66' are varied in relation to each other causing the pointer 66 to move over the scale and thus indicating the position of the tuning condenser. The parts of the indicator may be adapted to operate as a motor to replace motor 26 in the receiver and controlled by resistance 63 placed in remote control unit 9.

Connections 77 of Fig. 4 are terminals of a detachable portion 78 of a multiwire plug receptacle 79 to be later described with wires 12, 13, 91, 18, 65, 101, 97, 98, 99, and 105 incorporated in a multiwire cable 8 leading to the receiver 5, as shown in Fig. 5. Current is brought to receptacle 79 from the house lighting circuit by conduit 3 leading to further receptacles 79' and receptacle 87 to be later described. When plug 78 is inserted into receptacle 79 which extends through cover 151 of outlet box 150, all remote control connections are made as well as the receiver operating currents supply connections to terminals 10 and 11. Conduits 2 and 4 are arranged to conduct the speaker and control circuits, respectively, to additional receptacles 79' with a further extension of current supply conduit 3 to the same receptacles. Cable 8 contains wires leading to current supply terminals 10 and 11.

Referring again to Fig. 4, it will be seen that to adjust the essential controls of the receiver from a remote point, it is necessary to bring only wires 91', 18', 65', 101', 97', 98', 99' and 105' in cable 7 from terminals 77 to the detachable plug 6 and remote control unit 9 of Fig. 5. Hence, when plug 6 is attached to any receptacle, such as 79 or 79', the remote control unit is capable of controlling the receiver since control wires are incorporated in conduit 4. At the same time a loud speaker 103 may be operated from the same receptacle 79', since loud speaker wires are incorporated in conduit 2. Again, since current supply wires are incorporated in conduit 3, it is possible to plug in a reading lamp 1 or other electrical accessory at the same time remote control unit 6 is connected to this receptacle. This will be termed a universal control socket to more clearly describe the function of the system. Special receptacle 87 of Figs. 5 and 12 is provided without control connections so that loud speakers and electrical attachments may be plugged in separately or simultaneously, or the current supply connections may be utilized to electrify the field coils of dynamic speakers, the usual speaker connections being used to operate the voice coil of same.

Since control, loud speaker and current connections are provided at all receptacle 79 or 79', the plug 78 attached by cable 8 to radio receiver 5 may be plugged into any receptacle such as 79' and the receiver controlled from any other receptacle, such as 79. This system is ideally suited for home installation and its operation together with novel plug receptacles for same, will be described forthwith.

A typical plan of a house 107 is shown in Fig. 6 with speaker, control and current supply circuits 2, 4, and 3, respectively. Various combinations of universal control sockets 79 and special sockets 87 are shown, making it possible to provide one or more loud speakers automatically connected in series, in parallel or in series parallel, as desired.

In Fig. 6 various rooms are indicated, such as living room, dining room, kitchen and also an outside porch, with radio receiver 5 located in closet 108 and connected by means of cable 8 and plug 78, to universal control socket 109. Remote control unit 9 is connected by means of cable 7 and plug 6 to universal control socket 110 located, for example, in the dining room and connected by speaker circuit 2, to special sockets 112 and 113, and to speakers 115 and 114, respectively. Since all the universal sockets, such as 109, are connected with current supply circuit 3, the radio set 5 receives its operating current. Its radio current is received from the current supply circuit through the self contained antennae condenser 106 as indicated in Fig. 4 already described, thereby utilizing the house wiring system as a radio antenna and as a ground connection. In like manner control circuit 4 and speaker circuit 2 are connected to all universal control sockets so that the receiver 5 may be plugged into any one of same such as 109, and be controlled from any other, such as 110, automatically putting into operation the desired speakers, such as 114 and 115, with provision for connecting additional speakers or lamps and electrical devices to other sockets, such as 111 and 113. Sockets 116 and 117 automatically connect speaker 118, socket 121 connects speakers 123 and 124 and socket 119 connects speaker 120, circuits 2', 3' and 4' being extended to additional floors and chambers as desired.

It is desirable to provide speakers 114, 115, and 118 in the form of combined radiator and radio speaker cabinets, as indicated in my previous application Serial No. 188,954 entitled "Loud speaker cabinets".

To better illustrate the operation of this remote control system and the apparatus pertaining thereto, Figs. 7 to 14 will now be described.

The universal control receptacle 79, Figs. 8, 9, 10, and 11, consists of an insulating base 125 provided with a series of holes with spring contacts secured therein, the contacts having terminals to which connection can be made. The entire unit is provided with a plate 126 and cover 127. Spring contacts 129 in holes 128 are adapted to be connected to the control wires of control circuit 4 by means of the terminals protruding through the plate 126. Spring contacts 133, 134, and 135, in holes 130, 131, and 132, respectively, are adapted to be connected to the speaker circuit 2 by means of terminals protruding through plate 126, and in a manner to be later described. Contacts 132 and 135 are extended to form additional contacts 136 and 137, respectively, located in central aperture 138. Apertures 139 are provided with spring contacts 140 extended beyond insulating base 125 to form screw terminals 141 to which are connected the current supply wires of current supply circuit 3.

Remote control plug 6, Fig. 13, consists of an insulating base 144 provided with a central stud 145 adapted to enter aperture 138 and electrically connect spring contacts 136 and 137 and is so shaped to hold the plug into the receptacle. Prongs 133', 134', and 135' are adapted to engage with spring contacts 133, 134, and 135, respectively, prongs 133' and 134' not being shown. Prongs 133' and 134' are connected by remote control unit cable 7 to volume control 104, Fig. 4, located in remote control unit 9. These prongs may be omitted in plug 6 when other volume control methods are used, at which time a loud speaker 103' may be used at a universal control socket simultaneously with plug 6.

Base 144 is also provided with cover 146 and with prongs 129' adapted to engage with spring contacts 129. All of the prongs carried by insulating base 144 are provided with terminals 147 adapted to be connected to the proper wires of cable 7 leading to remote control unit 9.

Special receptacle 87, Fig. 12, is provided with speaker contacts 148 and 149 adapted to be connected to the proper wires of speaker circuit 2.

Current supply terminals 141 are adapted to be connected to the current supply wires of circuit 3. In this manner a loud speaker and electrical units may be connected separately or simultaneously to receptacle 87.

In Fig. 14 plug 78 is shown connected with universal receptacle 79, which is assembled with the usual form of outlet box 150 having cover plate 151. Plug 6 may also be inserted into receptacles 79 and 87 and receptacle 87 may also be mounted into outlet box 150. Armored cables 2', 3' and 4' contain the various wires of circuits 2, 3, and 4, respectively. Cover 127 is provided with extensions 152 and 153 to isolate circuits 2 and 4 from current supply circuit 3 carried by conduit 3' and thus comply with underwriters' regulations pertaining to such conditions.

Plug 78 provided with cable 8 leading to the radio receiver 5 is similar to plug 6 in every detail except the current supply terminals 154 are provided to engage with contacts 140 of universal control receptacles 109, 110, 111, 116, 117, 119, and 121 of Figs. 6 and 7. When plug 78 is inserted into any of the above receptacles, the radio receiver is automatically connected to the source of operating current and also provided with radio energy from the antennæ. The construction of both plugs 6 and 78 is such that it is impossible to incorrectly insert same into the receptacles. Also stud 145' of plug 78, not shown, may be of nonconducting material so that, when it is inserted, the spring contacts 136 and 137 are not electrically connected and the loud speaker current from the set is fed to the loud speaker circuit 2 through prongs 134' and 135', prong 133' being used as a synchronizing stud and is not connected to a set terminal 77. Since spring contact 133 then receives no current, loud speakers, connected as shown in Fig. 7, will not be short circuited or injured when receiver plug 78 is inserted into any of the universal receptacles.

With radio set plug 78 attached to closet receptacle 109, Figs. 6 and 7, the loud speaker terminals 96, Fig. 4, are automatically connected to loud speaker circuit 2, more clearly shown as wires 155 and 156 in Fig. 7, in which figure parts are located similar to Fig. 6. With remote control plug 6 attached to living room receptacle 110, stud 145 of plug 6 automatically connects prongs 136 and 137, thereby connecting only speakers 114 and 115 into the loud speaker circuit exclusive of all other speakers in the installation, and in series with each other. The connection is made from wire 156 by means of contacts 135, 137, 136 and 133 of receptacle 110, wire 157, contact 148 of receptacle 112, speaker wire 158, speaker winding 115, speaker wire 159, contact 149, wire 160, contact 148 of receptacle 113, speaker wire 161, speaker coil 114, speaker wire 162, to wire 155 of the speaker circuit. When plug 6 is connected to receptacle 111, the speakers 114 and 115 are again automatically connected into the loud speaker circuit and in series with each other by means of connecting wires 163 and 160. When either receptacle 110 or 111 is used, additional speakers may be connected in parallel with speakers 114 and 115, such as 111' shown attached to receptacle 111. At all times the current supply contacts 140 of the receptacles may be utilized for plugging in lamps, vacuum cleaners, electric heater, and other electrical attachments.

In Fig. 7 either receptacles 116 and 117 may be used to automatically hook up speaker 118 with the option of one additional speaker in parallel with 118. Receptacle 121 automatically connects in series only speakers 123 and 124 with receptacle 122 used as a special receptacle for speaker and lamp connections. Receptacle 119 automatically connects only speaker 120 to loud speaker circuit wires 155 and 156 exclusive of all other speakers, any of which, however, may be manually and separately connected by inserting a stud similar to 145 in aperture 138 of the receptacle which controls the speakers desired. Although the loud speaker, or reproducer, circuits indicated carry only the pulsating speaker actuating or audio currents, the armature current for dynamic reproducers may be obtained from the alternating current carrying contacts 140, or additional terminals may be provided in receptacles 79 and 87 to accommodate a separate speaker armature current circuit. When the house lighting current contacts are used for magnetizing the field of dynamic speakers, the alternating current type may be used or a supply of direct current may be obtained from rectifying tubes or dry metallic rectifiers located at each speaker or at a central point in the system.

Fig. 16 indicates a complete system of remote control for alternating current operated radio receivers, shown in more detail than in Figs. 1 and 4. In these and in the following figures like numbers indicate like parts. Detachable plug 170, with current supply terminals 10 and 11, may be inserted into current supply contacts 140 of receptacles 79 and 87 previously described. The radio receiver operating current is conducted by wires 12 and 13 to primary winding 89 of step-down transformer 86, inducing a lower voltage alternating current into secondary winding 90.

Control switch 17 puts the radio receiver into operation and completes the low voltage circuit to primary winding 92 of transformer 93 wherein current is induced into the various secondary windings 94, 195, 196, 197, and 198, respectively, supplying current for the tuning motor 26, radio amplifier tubes 81, 81' and detector tube 83, tube plates, rectifier tube 194 and audio amplifying tubes 85. The radio circuit consists of radio amplifying stages, detector stage, audio stages, loud speaker, radio frequency transformers, tuning condensers, inductances, resistances, wiring and other parts usually found in alternating current receivers. All parts above the receptacle contacts 77 are preferably located in the radio set and parts below are located in a flexible multi-wire cable attached to remote control unit 9.

Feed wire 193 is led from the secondary winding 90 of transformer 89 to an electric time clock 192 interconnected with control switch 17 and to be later described. Push buttons 43 and 44 of electrically interlocked motor reversing control switch 35 cause motor 26 to operate worm gearing 29 on motor shaft 26' and friction drive 30 and condensers 31 on condenser shaft 31' similar to Figs. 1 and 4. In Fig. 16 the parts intended to operate together are connected by dotted lines. When one of the push buttons 44 is depressed, the motor turns cam wheel 19 and slightly revolves friction arm 190 on an extension of motor shaft 26', closing contacts 186, which short circuit contacts 184 of control switch 35 through normally closed switch 183. Contacts 60 in the middle leg of the motor circuit are normally closed until one of the cams 57 lifts spring blade 59, at which time the motor circuit is broken and the broadcasting station is automatically tuned in. The contacts of relay 175, to be later described, are held open at this time by closing switch 174. As the motor armature stops rotating, spring blade contact 186 opens and moves friction arm 188 to a neutral position. Thus only a momentary pressure on the push buttons is required to start the motor since contacts 186 and 187 will then maintain the circuit to operate the motor in the proper direction. Stations can be progressively tuned in automatically by a slight pressure on either push button after each cam action.

Friction arm 188 is provided with a spring loaded plunger 189 having a shoe in frictional engagement with motor armature shaft 26', and is located in spring contact frame 190 attached to the motor frame or other support. Friction arm 188 acts as a static and dynamic brake to quickly stop the motor at the exact tuning adjustment when the circuit is opened since, at the instant the motor circuit is broken, the spring blades move the friction arm into the neutral position opposite to the direction of rotation of the motor armature.

When switch 183 is opened, the motor is operated by constant pressure on the push buttons and quickly comes to rest as soon as either contacts 184 or 185 of control switch 35 are separated. This makes it possible to manually tune in stations, such as distant stations, which are not located by the automatic cams. Friction arm 188 operates as a brake at all times and small condensers 35' eliminates the radio interference caused when the contacts of switch 35 are separated.

The friction driven cam wheel 191 is mounted on condenser shaft 31', which operates all the tuning condensers 31, shaft 31' being provided with extension 64' adapted to move contact arm 64 in engagement with resistance 63. As in Figs. 1 and 4, the movement of contact arm 64 operates tuning indicating meter 66 in remote control unit 9. In addition to pointer 66', indicating meter 66 is provided with contact arm 171 adapted to be rotated by knob 171', more clearly shown in Figs. 17, 18, 28, 29, and 30.

Contact arm 171 is provided with a fine contact wire 172 adapted to engage with contact 173 on indicator pointer 166' as the pointer moves over the graduated scale of the tuning indicating meter. In Fig. 16, with double pole switch 183 closed and switch 174 open, when it is desired to preselect an automatically tuned station, the pointer 171 is moved to that station on the graduated scale and the proper push button of switch 35 is depressed momentarily. The motor will start and will begin revolving the tuning condensers in the proper direction. Friction arm 188 will maintain the circuit until tuning indicator pointer 66' has made contact with selector arm 171, at which time a circuit will be completed from secondary winding 198, through lamp 67' in series with relay 175. Relay 175 will open the short circuit across contacts 60 slightly in advance of the time when the proper cam 57 opens contacts 60 to stop the motor and exactly tune in the desired station. Previous to this time, contacts 60 have been short circuited by relay contacts 175 and intermediate cams 57 had no effect. Lamp 67' is preferably colored to distinguish it from pilot light 67 so that, as soon as the colored lamp lights, it will indicate that the desired preselected station has been automatically tuned in and will act as a luminous station tuning indicator. Lamp 67' also regulates the amount of current passing through relay 175. Switch 174 is normally closed when manual tuning of distance stations or momentary contact progressive automatic tuning of stations is desired. Thus, by setting selector arm 171, any preselected station may be automatically tuned in and in addition all other stations will be silent, as indicated in Figs. 1 and 24, together with a luminous indicator indicating when the tuning operation has been completed. Electric time clock 192 is arranged to automatically tune in stations at various times, as will be shown in more detail in Figs. 17 and 18.

The volume control, Fig. 16, is similar to Fig. 1 but is shown in more detail. The broadcast radio wave is picked up by antenna 71' or is obtained from the lighting circuit through condenser 106, and is amplified by radio frequency transformers 89, 89', and 82, and by radio frequency tubes 81 and 81' of the screen-grid type. One side of primary winding 176 of radio transformer 89 is connected by wire 74 to the screen-grids of tubes 81 and 81' and to volume control resistance 104 in remote control unit 9. By regulating the resistance of volume control 104, at the remote control unit, the amplifying characteristics of the radio stage tubes is altered and at the same time part of the antenna current is effectively by-passed to the ground. This alters the amplification of the radio stages as well as the output to the dynamic speaker 199, the voice coil of which is connected to output transformer 85a and the armature coil connected to rectifying tube 194, thus regulating the volume of sound emitted from the loud speaker or speakers. This method of remote volume control has been found free from squealing, hum or other radio interference principally because one side of the radio circuit is at ground potential through ground resistance 104 and because condenser 177 acts as a by-pass of interference surges to the ground.

It has now been demonstrated how the essential controls are performed from any point remote from the radio receiver. Time control and tone control as well as phonograph and television controls will be now described.

In Figs. 16 and 17, terminals 178 and 179 are provided for electric recording and reproduction of phonograph records. Terminal 179 is connected to wires 201 and 201' leading to a grounded connection on the radio set. Terminal 178 is connected by wires 181 and 181' to the grid of detector tube 83. A microphone, not shown, may be connected to "phono" terminals 178 and 179 in remote control unit 9. Electrical impulses are transmitted to the audio stages, amplified by the audio amplifier of the radio set and transmitted to receptacle 79. The terminals of a recording device, not shown, may now be attached to the speaker terminals of receptacle 79 and the sound entering the microphone passes through the amplifiers and will be recorded on a suitable record, tape or film. To reproduce the record, a pick-up device, not shown, may be attached to the "phono" terminals of the remote control unit. The recorded sound waves will now be amplified by the audio stages of the radio receiver and reproduced by the loud speaker, the volume being regulated by volume control 104. In a similar manner television may be reproduced at the remote control unit by attaching a televisor, not shown, into "telev" terminals 179 and 180, terminal 180 being connected by wires 182 and 182' to audio transformer 84.

Since this system of remote control for radio receivers provides loud speakers and reproducers in a plurality of rooms, it is necessary to provide a tone control or modulator for the receiver to regulate the tone and compensate the acoustical deficiencies of rooms. These deficiencies manifest themselves as excessive reverberations from bare rooms or absorption by draperies and carpets. Tone control is also advantageous in reducing the effects of static, since it is a well known fact that static occurs at frequencies above or on the top of the usual 5,000 cycle audibility range of the receiver. By attenuating the amplification of the high frequencies, the audibility of static discharges is thus materially reduced and, in radio-phonograph combinations, it is effective in reducing or eliminating the unpleasant needle-scratch, which also occurs at the higher frequencies.

A resistance 203 is provided in remote control unit 9 connected by wires 202 and 202' to a condenser 200 connected to the last or output stage of the radio receiver. The fixed condenser has a tendency to by-pass the higher audio frequencies. By varying resistance 203, this by-passing effect is varied. As the resistance is decreased, the by-passing effect is increased and there is a greater accentuation of bass register and vice versa. As a result, the tone can be altered to suit the acoustics of different rooms and to modify reproduction to suit either music or voice to greatly enhance the enjoyment of radio programs.

Figs. 17 and 18 illustrate one form of remote control unit 9 with the various units enclosed in a case 205 provided with partition 206, base 207 and multiwire cable 7. The manual pilot switch and volume control knob 104', tone control knob 203', manual-automatic tuning switch knob 183', selector arm knob 171' and luminous indicator switch 174', all operate their respective controls. Pilot light 67 and luminous tuning indicator light 67' are provided with different colored signal lenses or "bull's-eyes" 67a and 67b respectively, with phonograph and television terminals appropriately indicated. The tuning control push buttons 43 and 44 are provided with piano key type operating levers 43' and 44', respectively.

Fig. 20 illustrates these levers in more detail and they are provided as an added convenience to facilitate the operation of the push buttons. Levers 43' and 44' are each provided with a rounded fulcrum 208 at one end adapted to rest on case 205, and with a depression adapted to fit over the push buttons. A flanged stud 206 protrudes into the case and is held by coil spring 207. The levers provide a mechanical advantage in operating the push buttons and also provide a more restful surface to the fingers of the operator.

Integrally mounted pilot switch 17 and volume control rheostat 104 are adapted to be automatically operated by a time clock 192, shown in Fig. 18, mounted in a common unit 210 with tuning indicating meter 66, unit 210 being provided with a dial 211 and transparent dial cover 212. Clock 192 is an electric clock and preferably of the motor-wound spring type which will keep on running when the remote control unit 9 is temporarily disconnected from the control receptacles, although the synchronous type may be used. Clock 192 is provided with mechanism, not shown, similar to that found in the well known alarm clocks, adapted to turn pilot switch 17 on and off at predetermined intervals by extension shaft 17b operating cam 17a. The time at which clock 192 operates pilot switch 17 to turn the radio set on or off, is adjusted by key stems 192a and 192b, respectively, the stems engaging with gears 192c to turn the small marked indicators on the dial and set the clock mechanism, not shown. As the pilot switch is thus operated, volume control rheostat 104 is also operated to regulate the volume as desired. An adjustment, not shown, is provided by which the sound emitted by the loud speaker is brought to the desired volume. An automatic volume control in the set maintains this degree of volume.

Time clock 192 is also adapted to automatically tune in preselected stations at predetermined times as indicated by the conventional hands passing over the markings on dial 211. Case 210 is provided with cams 43a and 44a on shafts 43b and 44c, operated by clock mechanism, not shown. Shaft 44b is hollow to receive extension shaft 17b. The clock mechanism is provided with a mutilated gear 214 engaging gear 216 frictionally mounted on extension 217 of tuning selector arm 171. Gear 214 is provided with a clutch 216 by which it can be manually disengaged from the clock mechanism when clock tuning is not desired. The teeth of mutilated gear 214 are arranged in accordance with the desired time sequence various stations are desired. An additional mutilated gear, not shown, is adapted to swing selector arm 171 to various positions, and at the same time, cams 44a and 44b operate the proper contacts of tuning control switch 35. The contact on tuning indicator pointer 66', in conjunction with friction arm 188, already described, automatically opens the tuning motor circuit when the desired station is tuned in at the proper time. Various time and station selections are obtained by changing mutilated gear 214. Selector arm knob 171' can be adjusted independently of the clock mechanism by means of the frictional mounting of gear 215.

In Fig. 28 is shown a slightly modified system of preselected station automatic tuning control with luminous tuning indicator, as provided in a remote control unit 9, shown in Fig. 30. Indicating meter 66, as in Fig. 16, is provided with tuning indicator pointer 66' and selector arm 171 having contacts as shown in Fig. 29. Remote control unit 9 is provided with a suitable case 220 in which is mounted pilot switch 17, volume control rheostat 104, tuning indicating meter 66, relay switch 174, preselective tuning knob 171', and multiwire cable 7. Volume control knob 17' operates volume control rheostat 104 and pilot switch 17 to turn the radio receiver on and off, as already described.

Knob 171' is secured to shaft 171a adapted to rotate in bushing 221 by which the tuning control unit is secured to case 220 of remote control unit 9. This bushing also secures an insulated strip 222 on which reversing switch 35 is mounted. As shaft 171a is turned to the left by knob 171', arm 223, frictionally mounted on shaft 171a, is rotated to the right to close contact 35a of mechanically interlocked motor control switch 35. Motor 26 rotates tuning condensers 31 through gearing 29 and friction drive 30, as outlined in Fig. 16, to move contact arm 64 over resistance 63 and operates pointer 66' of tuning indicating meter 66. Direct current for operating meter 66 is here obtained from the alternating current supplied by wires 27 and 28 by means of the well known type of dry rectifier 225. Direct current permits of the use of a simple and inexpensive type of indicating meter.

As knob 171' is turned to close the contacts of switch 35, selector arm 171 may be moved to any desired station position indicated on the graduated dial of meter 66. A pin 226 attached to a flange on shaft 171a moves in a slot 227 in arm 171 and is adapted to move arm 171 as soon as any pair of contacts on switch 35 are closed, since arm 223 is frictionally mounted on shaft 171a. A spring, not shown, maintains closed contacts on switch 35 until it is desired to reverse the tuning motor 26. The indicating pointer 66' now moves toward selector arm 171 until contacts 172 and 173 complete an electric circuit through normally closed switch 174, luminous tuning indicator lamp 67' and relay 175, as shown in Fig. 28. At the instant of contact, relay 175 opens the middle leg of the motor circuit and the rotation of tuning motor 26 is instantly stopped by magnetic brake 26'. Thus the desired broadcasting station can be preselected and automatically tuned in at the same time that the point of tuning is visually indicated by a tuning indicator light. This light also serves to limit the consumption of electrical energy by the relay 175. Contact 172 consists of a fine wire adapted to slide over contact 173 when it is desired to reverse the tuning motor to tune in a station, indicated by the graduations, on the opposite side of the indicating meter dial. When it is desired to manually tune in stations, such as distant stations where a very fine tuning adjustment is required, relay switch 174 may be opened and the motor controlled directly by operating the contacts of switch 35 by means of knob 171'. This method of tuning control is readily adapted to the automatic time clock tuning shown in Figs. 17 and 18.

Details of the apparatus at the receiving set required to perform the various remote control functions will now be described and are shown in Figs. 21, 22, 23, and 24.

In Fig. 21 a housing 230 equipped with cover 230', is adapted to house motor 26, gearings 29 and 29', friction drive 30, resistance unit 63, cam wheel 191 and cams 57, and is adapted to be attached to one end of tuning unit 31, as shown. Tuning condenser shaft 31' is extended into housing 230, on which is securely mounted cam wheel 191 by set screw 191'. Motor shaft 26' is extended to engage with friction arm 188 attached to one side of housing 230. A second motor 26a is indicated by dotted lines and is intended to be used as part of a reversible motor unit made up of two non-reversible armatures mounted on a common armature shaft. Resistance 63 is here mounted on one side of cam wheel 191 and contact arm 64 is intended to remain stationary and is secured to terminal 233 on an insulating strip 231 on one side of housing 230, the two terminal ends of resistance 64 being electrically connected to outside terminals 232 by flexible wires 63'. Motor 26 operates shaft 31' through worm gearing 29, a pinion, not shown, mounted on shaft 29' and engaging with gear 129 frictionally mounted on shaft 31', driving shaft 31' by spring friction washer 30' and permitting tuning condensers 31 to be independently operated by the usual knob and gearing, not shown, from the panel of the receiver.

Automatic tuning cams 57, adjustably mounted on cam wheel 191, engage with spring blade 58 to open contacts 60 and thus automatically tune in broadcast stations in the manner already described. Contacts 60 are provided with an adjusting screw 60' whereby the tuning in of stations can be more closely regulated. Cams 57 are symmetrical on either side so that they will operate at exactly the same time in either direction. The operation is such that the contacts 60 actually break the circuit an instant before the time required so that at the time the motor actually stops, the cams will be directly on center. As noted in Fig. 23, the cams can be adjusted at any position around the rim of the cam wheel, being held to the periphery of the cam wheel by an overhanging lip adapted to engage under the rim of the cam wheel. The cams are clamped to the wheel by screws 57'. Cam wheel 191 is preferably made of bakelite or other insulating material, but metal may be used providing resistance 63 is properly insulated. Cam wheel is also provided with a counterweight 234 to compensate for the unequal rotating balance of tuning condensers 31, and is also provided with graduated scale 228 to assist in setting cams 57. Contact arm 64 is provided with pointer 64a to indicate the wave length or setting of various broadcasting stations. Fig. 24 illustrates an enlarged section of cam 57 operating motor contacts 60, silent tuning contacts 81 and contacts 67a, which are connected to a luminous tuning indicator light, not shown, in remote control unit 9. As stations are automatically tuned in by cam 57, contacts 67a are closed, as shown, completing an electrical circuit to the luminous indicator.

Motor 26 may take several forms, as indicated in Figs. 1, 2, 4, and 16, as well as shown in Figs. 25, 27, and 31, to produce reversible motion to tuning unit 31. In Figs. 25, 27, and 31, the reversible motion is produced by the magnetic attraction of opposed field coils, or solenoids, for a movable armature 236. The electromotive force exerted by the solenoids tends to draw in the armature until the center of the armature is at the center of the field coil, the intensity of the force being inversely proportional to the displacement of the centers. The attraction of the armature may be intensified by providing an additional magnetic field at the center of the armature and of opposite polarity, especially when direct current is used, in which event the action will be similar to the armature of a motor. The centers of the solenoids are displaced from each other, each solenoid drawing the armature toward itself. The longitudinal motion of the armature is transferred to rotary motion at the tuning unit shaft 31', by rack 237 attached to the armature, and by pinion 238 secured to shaft 31'. Thus, as current is applied to either armature, the tuning condensers are rotated, but since the action of the armature is very rapid, means must be provided to govern or control the speed of rotation of shaft 31'. This means must be in the form of a time-check device which will regulate the speed of movement of the armature.

In Fig. 25 solenoids 234 and 235 are mounted on opposite sides of case 230 with armature 236 adapted to move between the solenoids as shown. Solenoid terminals 32, 33, and 34 are adapted to the same circuit wires as like terminals on motor 26 in Figs. 1, 4, and 16, being controlled by the same motor control switch 35, condenser 100 not being required, terminals 32 being normally connected together. An escapement device 240, which has escapement pins or pawls 241 similar to the well known clock escapement, is mounted on bearing 243 and in engagement with ratchet teeth 239' of ratchet wheel 239 frictionally mounted on shaft 31'. As armature 236 operates the tuning unit shaft, the pawl pins 241 are alternately forced to travel over teeth 239', moving escapement extension 240' in a reciprocating arc. Adjustable weight 242 adds inertia to the pendulum 240', thereby effecting its periodical motion. Since a small amount of time is required for each reversal of the swinging weight, only one tooth of gear 239 is allowed to pass under the pawls for each pendulum cycle. By moving the position of the weight, the period of vibration of the pendulum is changed, thus increasing or decreasing the speed of rotation of the condenser shaft. Pendulum 240' is preferably placed below axis 243, but is here shown above the axis for simplicity in the drawings. As either push button of switch 35 in the remote control unit is operated, condenser shaft 31 will be slowly rotated in either direction and various broadcasting stations will be tuned in. The frictional mounting allows independent panel operation of the tuning condenser and also softens the intermittent effect of escapement 240.

Indicating meter resistance 63, with moving contact 64, is attached as shown with terminals connected to the same wires as in previous figures. In Fig. 26 automatic tuning cams 57 are adjustably mounted on an insulated rod 245 operated by one end of crosshead 246 attached to an extension of armature 236, the other end of the crosshead operating contact 64 connected to indicating meter 66, not shown. In Fig. 26, solenoids 234 and 235 are preferably mounted in an insulated tubular housing 247 attached on one end of tuning unit 31. This construction is preferably used in radio receivers in which the tuning condensers are mounted parallel to one side of the cabinet and in which there is insufficient space for housing 230, previously described. Rotative motion is transmitted to shaft 31' by a helical or inclined groove 248 provided in the sides of a tube 249 attached to armature 236. Tube 249 is adapted to slide over shaft 31', the end of which is provided with a pin 250 engaging with groove 248 as shown in Fig. 27. Thus, movement of armature 236 slowly revolves the tuning condensers 21, the movement being controlled by the movement of the air through adjustable metering orifice 252 in enclosing tube 251, the adjustment being regulated by valve screw 253. Solenoids 234 and 235 are controlled similar to Fig. 25, in which automatic tuning may be provided by cam wheel 191, not shown, mounted on shaft 31', as well as silent tuning and luminous tuning indication. One of the cams may be used to operate a filament switch directly at the radio receiver to turn the radio set off and on from the remote control unit, or one of the extreme positions of the armature may be utilized to operate an alternating current switch, as indicated in Fig. 31.

Fig. 31 illustrates my radio remote control system applied to a conventional alternating current operated radio receiver to readily convert the same to be controlled from any remote point within the limits of the system. The control transformer unit A, radio receiver B, remote control unit C, controlling unit D, and reproducer E are all preferably connected as shown, although minor departures may be made within the scope of the system. Parts are indicated by the same numbers as in figures already described, and units A, B, and D are preferably located within a suitable cabinet or enclosure, units A and E being attached to the terminals 77 of receptacles 79 and 87.

Detachable plug 170 is attached to a convenient source of alternating current, such as receptacles 79 and 87, to provide current to step-down transformer 89. Low voltage current is conducted to units C and D by wires 27, 28, 27' and 28', unit C being provided with tuning unit control switch 35, tuning indicator 66, volume control 104, pilot and indicator lamp 67, and two-way double-circuit pilot switch 263, which is provided with a spring, not shown, to hold the same in either the on or the off position. As switch 263 is snapped to the on position, current from wires 27 and 28 is conducted to solenoid 234 through closed contacts 269. Armature 236 quickly moves toward 234 until spring blades of two-way double-circuit switch 259 opens contacts 260 and closes contacts 261 in series connection with solenoid 235. Rapid action of armature 236 is permitted by the neutral zone 254 on rack 237, which disconnects rack 237 from pinion 238 on condenser shaft 31' already described. At the instant switch 263 is operated, current is also conducted to resistance 63, contact 64 connected to indicating meter 66 and to pilot light 67, the lighting of which indicates that the radio receiver has been turned on. The movement of armature 236 from its extreme position, causes pin 256, attached to the armature, to move the slotted toggle lever of switch 258, thereby connecting the current transformer 93 of radio unit B to the alternating current supply wires 12 and 13 through wires 13a and attached plug 170'. At the same time the antenna has been connected to the radio receiver through condenser 106.

Pin 255 of armature 236 engages slotted lever 257 of curved rock 237 mounted on axis 237', the slotted lever providing an increased ratio of applied force when the pull of the armature is lowest at its extreme positions. As the magnetic center of the armature approaches the field of the solenoids, the effective length of lever 257 decreases to compensate for the inverse ratio of magnetic pull of the armature.

Various broadcasting stations may now be tuned in from the remote control unit by manipulating tuning control switch 35 as shown in Figs. 1, 16, and 25, escapement device 240 controlling the speed of rotation of the tuning condensers 31 and indicating meter 66 indicating the tuning adjustment at the remote control unit. Toothed wheel 239 is here provided with an adjustable counterweight 234' which may be adjusted to balance the tuning units of various receivers. The volume of sound emitted by loud speaker 103 is controlled, as before, by volume control rheostat 104, the ground connection being carried back by wire 27' to ground wire 201 attached to unit A, this ground also providing a ground connection for radio unit B.

When pilot switch is snapped to the off position, as shown in Fig. 31, solenoid 235 receives current through the then closed contacts 261, until armature 236 reaches its extreme limit of travel in that direction when switch 258 turns off the radio set and opens contacts 261 to prevent a continual drain of current while the set is out of operation. At the same time pilot light 67 is turned off indicating that the radio set is turned off, and contacts 260 are again closed and ready to function when it is again desired to operate the radio receiver. Pilot switch is preferably of the toggle type indicated at 258, being operated by a pin on the shaft of volume control rheostat 104 and as indicated in Fig. 17. Switch 259 is also preferably of the toggle type operated as is 258 or 258 and 259 may be combined into a single switch unit operated by pin 256 engaging with a common slotted toggle lever.

As indicated in Figs. 1, 4, and 16, it is very desirable to provide an automatic disconnection so that the operating current is disconnected from the radio receiver when the detachable plug receptacle contacts 77 are separated, for instance, while the remote control unit is detached from one of the control receptacles of Figs. 4 and 6, and before it is again attached to another receptacle. In Fig. 31 terminal 77' is provided with contacts 270 and 271, and indicated in more detail in Fig. 32. While detachable plug 6 of remote control unit 9 is attached to the control receptacle, an insulated prong 129' enters between contacts 270 and 271. As soon as plug 6 is withdrawn while the receiver is in operation, these contacts close and connect wire 28 with pilot switch wire 269, causing armature 236 to move over to its extreme limit in the same manner as when pilot switch 263 is snapped to the off position. In this manner the remote control system is inherently safe and damage to the receiver by inadvertent operation is automatically prevented.

It should be quite obvious that the essential controls outlined in Fig. 31 can be readily attached to any radio receiver to control the operation of the same from a point remote from the receiver. Additional controls and apparatus may also be added, as already described, without detracting from the efficiency, convenience and utility of the system described in the figures and in the disclosure.

It now should be quite obvious that the present invention offers complete and universal remote control of a radio receiver from various rooms of a house or other structure at the same time automatically controlling the operation of only those loud speakers which it is desired to operate in various combinations of electric hook-ups with each other. It is also obvious that when the various control receptacles are not used for attaching the remote control unit or the radio receiver to provide same with necessary filament current, antennae, speaker, ground and control connections, the same receptacles also provide sockets for electrical attachments, thus causing a substantial saving in the cost of labor and equipment. It will be noted the system here described provides adjustment of all the essential controls of any radio receiver from a number of remote locations as well as providing a tuning indicator, an automatic tuning selector, a pilot and dial light and means whereby the radio receiver is automatically turned off whenever the remote control unit is disconencted from the system.

It is obvious that the invention may be embodied in many forms and constructions, and I wish it to be understood that the particular forms shown are but a few of the many. Various modifications being possible, I do not limit myself in any way with respect thereto.

What I claim is:

1. In a radio receiver having a variable tuning device, mechanism for adjusting said tuning device including a reversible motor, an automatic mechanically operated retaining control switch in circuit with said motor and cooperative with said tuning device for retaining said motor in operation in a desired direction of rotation, a stopping control switch in circuit with said retaining switch, adjustable means associated with said tuning means and cooperating with said stopping switch for stopping the operation of said motor at a predetermined adjustment of said tuning means, a reversible normally open starting switch at a remote point with circuit connections for starting said motor in a desired direction of rotation to set said mechanism in operation, and means for shunting at least one of the control switches from a remote point to render it ineffective, said starting switch and said mechanically operated retaining control switch being effectively connected in shunt with one another while said tuning device is being adjusted by said motor, so that said starting switch initiates the operation of said motor by a momentary closure and said retaining control switch continues the operation of said motor after the opening of said starting switch.

2. Tuning means comprising a reversible electric motor, a tuning element driven thereby at a reduced speed, two discrete switches at the receiver in series with the motor when the motor is running, a rotatable member driven by said motor and having a number of projections corresponding with predetermined frequencies for moving one switch element and opening the motor circuit automatically when the tuning element is adjusted to the desired point, means actuated by the rotation of said tuning element for frictionally holding the other switch in closed circuit position when the tuning element is rotating, and a remote switch for controlling the starting of the motor in either direction.

3. Tuning means for a broadcast receiver comprising means for adjusting the frequency of reception, reversible driving means including an electromagnetically movable member and circuit for moving the adjusting means, a switch in circuit with said member having a movable element actuated by said adjusting means to open said circuit, manually operable means in shunt with said switch for maintaining the circuit closed regardless of the opening of the switch, a second switch with a movable element driven by said adjusting means, and a remote switch having movable contact members for closing the motor circuit to move the adjusting means in either desired direction, said second switch and said remote switch being effectively in parallel with one another, whereby momentary closure of said remote switch will cause the closure of said second switch to be effective until said frequency adjusting operation is substantially complete.

4. Tuning means comprising a reversible electric motor, a tuning element driven thereby, two discrete switches at the receiver in series with the motor when the motor is running, a rotatable member driven by said motor and having a number of projections corresponding with predetermined frequencies for moving one switch element and opening the motor circuit automatically when the tuning element is adjusted to the desired point, means actuated by said tuning element so that the other switch is frictionally held in closed circuit position when the tuning element is rotating, and means in shunt with said switches for controlling from a distance the point at which the tuning element will stop.

5. A radio receiver comprising a variable tuning device, reversible means for adjusting the tuning device in either direction including an electric motor, an automatic retaining control switch having a member in circuit with said motor and cooperating with said tuning device for retaining the motor in operation in a desired direction, a stopping control switch in circuit with said retaining control switch, means associated with said tuning means and cooperating with said stopping control switch for stopping the operation of the motor at a predetermined point in the adjustment of the tuning means, a single spring-pressed starting switch at a remote point and circuit connections for starting said motor in a desired direction of rotation, and means at a remote point for rendering one of the control switches ineffective by providing a shunt path therefor, said starting switch and said retaining control switch being effectively in parallel with one another, whereby momentary closure of said starting switch will cause the closure of said retaining control switch to be effective until said tuning device is substantially completely adjusted.

6. A radio receiver comprising tuning means for adjusting the frequency of reception, a reversible electric motor and circuit connections for moving the adjusting means, a switch in circuit with the motor having a movable element actuated by the adjusting means to open the circuit, manually operable means in shunt with said switch for maintaining the circuit in a closed condition regardless of the opening of the switch, a second switch having a movable element driven by said adjusting means, and a remote reversible starting switch for initiating the closing of the motor circuit to move the adjusting means in either desired direction, said remote starting switch and said second switch being effectively in parallel with one another, whereby momentary closure of said starting switch will initiate the closing of the motor circuit and the operation of the motor will initiate the closure of said second switch, so that said motor will operate until the frequency adjustment is substantially complete, after the return of said starting switch to its open position.

OSCAR P. LIEBREICH.